United States Patent
Vempati et al.

(10) Patent No.: US 9,230,269 B2
(45) Date of Patent: Jan. 5, 2016

(54) SEGMENT-BASED FLOORS FOR USE IN ONLINE AD AUCTIONING TECHNIQUES

(71) Applicant: Pubmatic, Inc., Redwood City, CA (US)

(72) Inventors: Sreekanth Vempati, Andhra Pradesh (IN); Manish Tayal, Fremont, CA (US); Mohamed Hanoosh Mathappulan, Kerala (IN); Sandeep Repakula, Andhra Pradesh (IN)

(73) Assignee: Pubmatic, Inc., Redwood City, CA (US)

( * ) Notice: Subject to any disclaimer, the term of this patent is extended or adjusted under 35 U.S.C. 154(b) by 0 days.

(21) Appl. No.: 14/690,786

(22) Filed: Apr. 20, 2015

(65) Prior Publication Data

US 2015/0356632 A1 Dec. 10, 2015

Related U.S. Application Data

(63) Continuation of application No. 14/296,041, filed on Jun. 4, 2014.

(51) Int. Cl.
*G06Q 30/00* (2012.01)
*G06Q 30/02* (2012.01)

(52) U.S. Cl.
CPC .................................. *G06Q 30/0275* (2013.01)

(58) Field of Classification Search
CPC .......... G06Q 30/0243; G06Q 30/0275; G06Q 30/0277; G06Q 30/02; G06Q 30/0251; G06Q 30/08
USPC .......................................................... 705/14.1
See application file for complete search history.

(56) References Cited

U.S. PATENT DOCUMENTS

| | | | |
|---|---|---|---|
| 2010/0262458 A1 | 10/2010 | Schwarz et al. | |
| 2011/0231242 A1 | 9/2011 | Dilling et al. | |
| 2011/0231264 A1* | 9/2011 | Dilling | G06Q 30/02 705/14.71 |
| 2013/0151350 A1 | 6/2013 | Kumar et al. | |
| 2014/0006144 A1 | 1/2014 | Pardoe et al. | |
| 2014/0081742 A1 | 3/2014 | Katsur | |

OTHER PUBLICATIONS

U.S. Appl. No. 12/510,061, filed Jul. 27, 2009.
U.S. Appl. No. 14/276,658, filed May 13, 2014.
U.S. Appl. No. 14/296,041, filed Jun. 4, 2014.
U.S. Appl. No. 13/708,435, filed Dec. 7, 2012.
U.S. Office Action dated Jun. 24, 2015 from U.S. Appl. No. 14/701,239.
International Search Report dated Jul. 10, 2015 from International Application No. PCT/US2015/027023.
Written Opinion dated Jul. 10, 2015 from International Application No. PCT/US2015/027023.
International Search Report dated Jul. 8, 2015 from International Application No. PCT/US2015/028563.
Written Opinion dated Jul. 8, 2015 from International Application No. PCT/US2015/028563.

* cited by examiner

*Primary Examiner* — Daniel Lastra
(74) *Attorney, Agent, or Firm* — Beyer Law Group LLP

(57) ABSTRACT

Various aspects described herein are directed to different techniques for enabling ad server systems to dynamically determine minimum floor prices for individual incoming impressions, in which the determination of the minimum floor value for a given incoming impression may be based upon the value(s) of specifically identified impression parameters associated with that particular impression. Additional aspects are directed to various feedback techniques for measuring the effectiveness of the various Entity-based and/or Segment-based floors, and for dynamically adjusting various floor computation parameter values based on measured floor metrics and heuristics.

10 Claims, 10 Drawing Sheets

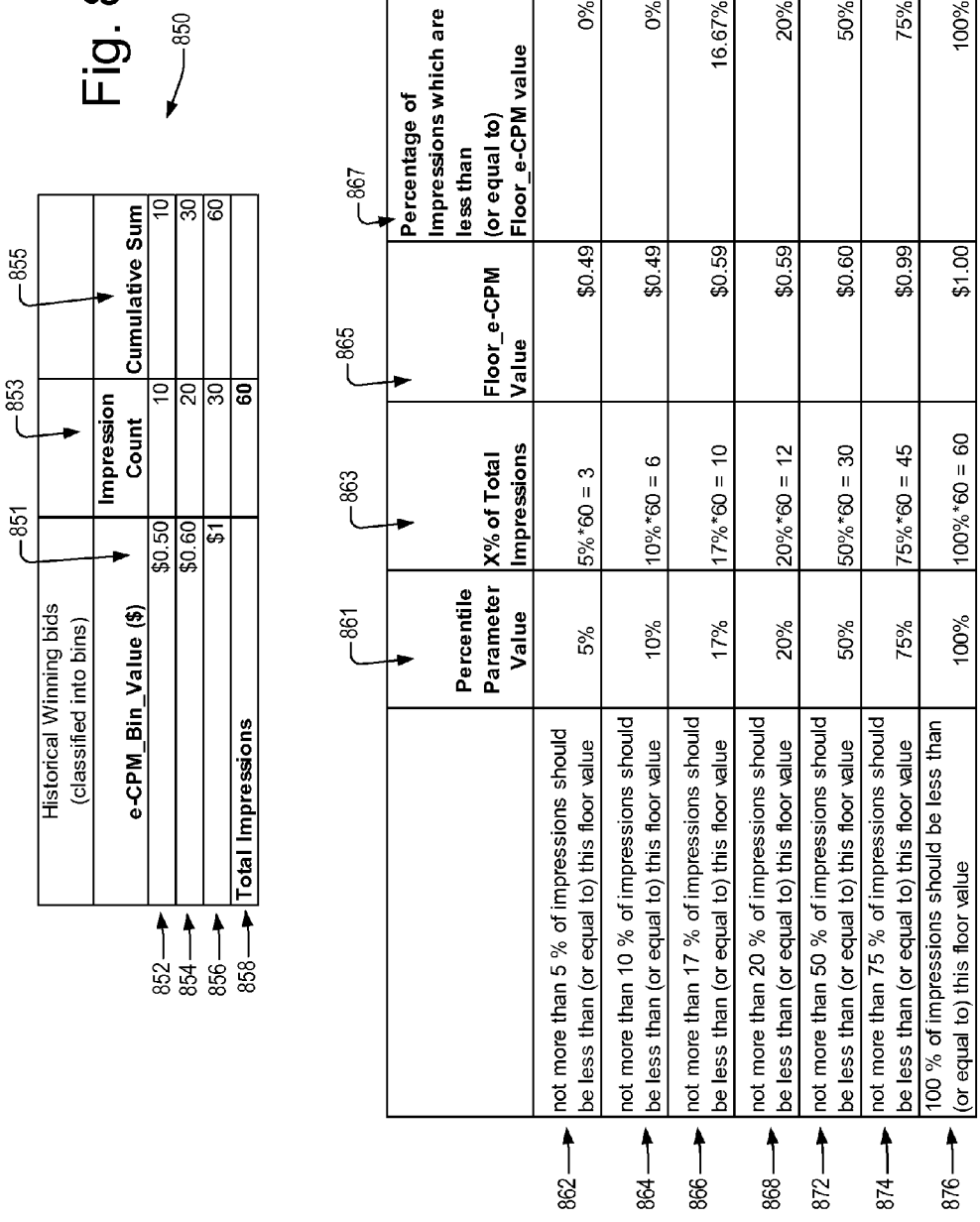

SEGMENT-BASED FLOORS FOR USE IN ONLINE AD AUCTIONING TECHNIQUES

CROSS-REFERENCE TO RELATED APPLICATIONS

This application is a Continuation of U.S. application Ser. No. 14/296,041, filed on Jun. 4, 2014, the contents of which are incorporated herein by reference in its entirety.

BACKGROUND

The present disclosure relates to online advertising techniques and, more particularly, relates to segment-based floors for use in online ad auctioning techniques.

A significant quantity of content published on the Internet is supported by advertisements ("ads"). Publishers of Internet-based content often make use of a robust infrastructure of Advertising Networks and/or exchanges that handles the selection, placement, and insertion of ads in web pages. These Advertising Networks and/or exchanges generally select from a set of available ads, based on various factors such as geographic location, subject matter, and the like, in an effort to present ads that are most likely to be maximize revenue in a given context. Advertisers pay the Advertising Networks and/or exchanges for ad exposures based on, among other factors, expected or actual performance of the ad determined, for example, by counting the number of times users click on the ad. Accordingly, revenue can be increased by placing ads to maximize response and effectiveness.

As the online advertising industry continues to grow, the amount of control that publishers (entities who have an inventory of advertising space to sell) want with respect to selling this ad space inventory also grows. As a result, there is an increasing desire among publishers to carve out specific inventory buckets for their ad space inventory. On the advertiser side, advertisers are now increasingly particular about how much they will pay to place their ads on Web pages.

Various mechanisms for measuring performance and effectiveness of advertisements are available. One well-known measurement of ad performance is effective cost per mille (e-CPM), which indicates a cost (or price) of showing an ad one thousand times. e-CPM is therefore a measurement of revenue that a publisher can expect to receive from an Advertising Network based on the number of impressions, or page views, of the content, e-CPM is often determined on an estimated basis. Revenue for an Internet publisher is maximized when an advertisement having high e-CPM is shown. Higher e-CPM means that an Advertising Network is willing to pay more because of an expectation that an ad will be more effective.

It would be desirable to provide publishers with greater level of control in determining which ads are served to them for display based on a variety of demographic and other categories. Overall this would also be desirable for the advertisers and entities providing services to advertisers. Advertisers would like to be able to target a specific audience and have the flexibility of paying more or less for a given ad segment depending on who will see the ad.

BRIEF DESCRIPTION OF THE DRAWINGS

FIGS. 8B and 8C show example data tables 850 and 860 which have been populated with sample data in order to help illustrate various aspects relating to the computation of e-CPM floor values for a given Entity.

DETAILED DESCRIPTION OF EXAMPLE EMBODIMENTS

Overview

Figure 1:
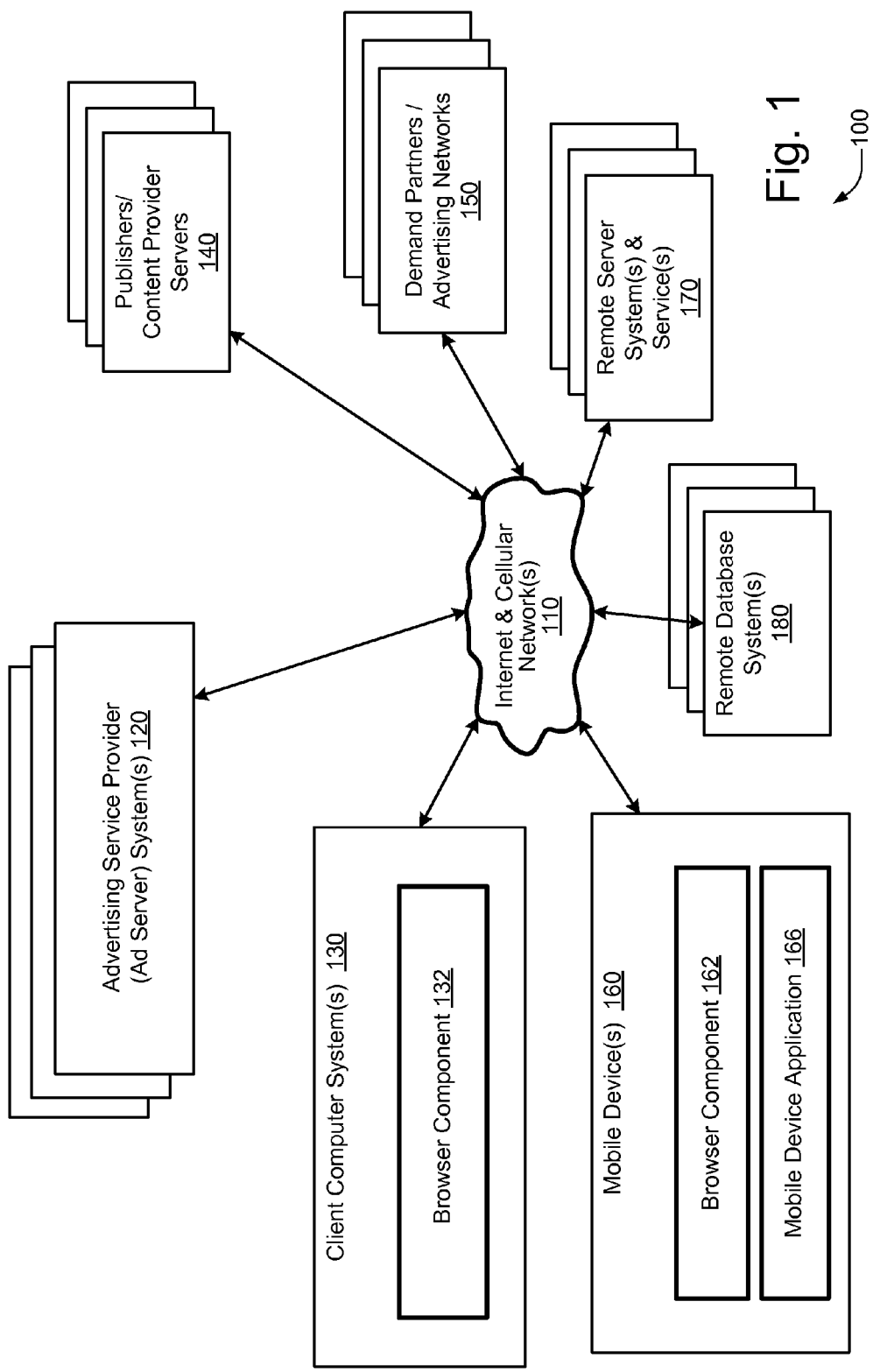
FIG. 1 illustrates a simplified block diagram of a specific example embodiment of an Electronic Data Network 100.

Various aspects described or referenced herein are directed to different methods, systems, and computer program products for enabling Advertising Service Provider Systems to dynamically determine minimum floor prices for individual incoming impressions, in which the determination of the minimum floor value for a given incoming impression may be based upon the value(s) of specifically identified impression parameters associated with that particular impression. Additional aspects are directed to various feedback techniques for measuring the effectiveness of the various Entity-based and/or Segment-based floors, and for dynamically adjusting various floor computation parameter values based on measured floor metrics and heuristics.

One aspect disclosed herein is directed to different methods, systems, and computer program products for calculating ad auction floor values for use in ad auctions conducted over an electronic data network. In at least one embodiment, various method(s), system(s) and/or computer program product(s) may be operable to cause at least one processor to execute a plurality of instructions for: identifying a first set of parameters for use in determining a first floor value representing a first minimum auction closing price for use with impression-related ad auctions; identifying, as part of the first set of parameters, a User ID parameter specifying a first User ID parameter value; accessing historical ad-serving records to retrieve a first set of winning bid histogram information relating to historical ad auctions conducted for a first set of ad impressions, wherein each of the first set of ad impressions is associated with the first User ID parameter value; using the first set of winning bid histogram information to dynamically determine a first floor value representing a first minimum auction closing price for use in ad auctions conducted for at least one ad impression associated with the first User ID parameter value; identifying a second set of parameters for use in determining a second floor value representing a second minimum auction closing price for use with impression-related ad auctions; identifying, as part of the second set of parameters, a User ID parameter specifying a second User ID parameter value; accessing historical ad-serving records to retrieve a second set of winning bid histogram information relating to historical ad auctions conducted for a second set of ad impressions, wherein each of the second set of ad impressions is associated with the second User ID parameter value; and; using the second set of winning bid histogram information to dynamically determine a second floor value representing a second minimum auction closing price for use in ad auctions conducted for at least one ad impression associated with the second User ID parameter value.

In at least one embodiment, various method(s), system(s) and/or computer program product(s) may be further operable to cause at least one processor to execute additional instructions for: identifying, as part of the first set of parameters, a Site ID parameter specifying a first Site ID parameter value; wherein the first set of winning bid histogram information relates to historical ad auctions conducted for the first set of ad impressions, the first set of ad impressions being associated with both the first User ID parameter value and the first Site ID parameter value; wherein the first floor value represents the first minimum auction closing price for use in ad auctions conducted for at least one ad impression associated with both the first User ID parameter value and the first Site ID parameter value; identifying, as part of the second set of parameters, a Site ID parameter specifying the first Site ID parameter value; wherein the second set of winning bid histogram information relates to historical ad auctions conducted for the second set of ad impressions, the second set of ad impressions being associated with both the second User ID parameter value and the first Site ID parameter value; and; wherein the second floor value represents the second minimum auction closing price for use in ad auctions conducted for at least one ad impression associated with both the second User ID parameter value and the first Site ID parameter value.

Additional method(s), system(s) and/or computer program product(s) may be further operable to cause at least one processor to execute additional instructions for: identifying, as part of the first set of parameters, a Site ID parameter specifying a first Site ID parameter value; wherein the first set of winning bid histogram information relates to historical ad auctions conducted for the first set of ad impressions, the first set of ad impressions being associated with both the first User ID parameter value and the first Site ID parameter value; wherein the first floor value represents the first minimum auction closing price for use in ad auctions conducted for at least one ad impression associated with both the first User ID parameter value and the first Site ID parameter value; identifying, as part of the second set of parameters, a Site ID parameter specifying the first Site ID parameter value; wherein the second set of winning bid histogram information relates to historical ad auctions conducted for the second set of ad impressions, the second set of ad impressions being associated with both the second User ID parameter value and the first Site ID parameter value; wherein the second floor value represents the second minimum auction closing price for use in ad auctions conducted for at least one ad impression associated with both the second User ID parameter value and the first Site ID parameter value; wherein the first User ID parameter value represents an identity of a first end user; wherein the second User ID parameter value represents an identity of a second end user which is different from the first end user; and; wherein the first Site ID parameter value represents an identity of a first website.

Additional method(s), system(s) and/or computer program product(s) may be further operable to cause at least one processor to execute additional instructions for: measuring effects of use of the first floor value in a first set of ad auctions conducted for a third set of ad impressions, wherein each of the third set of ad impressions is associated with the first User ID parameter value; automatically and dynamically adjusting the first floor value based on the measured effects of the use of the first floor value in the first set of ad auctions; measuring effects of use of the second floor value in a second set of ad auctions conducted for a fourth set of ad impressions, wherein each of the fourth set of ad impressions is associated with the second User ID parameter value; and; automatically and dynamically adjusting the second floor value based on the measured effects of the use of the second floor value in the second set of ad auctions.

Another aspect disclosed herein is directed to different methods, systems, and computer program products for facilitating servicing of ad requests over an electronic data network. In at least one embodiment, various method(s), system(s) and/or computer program product(s) may be operable to cause at least one processor to execute a plurality of instructions for: receiving, at an ad server, a first ad request, the first ad request including information relating to a first ad impression to be displayed in connection with a display of a first web page at a first end user's device, the first web page being associated with a first website, the first website being associated with a first publisher, the first ad impression having associated therewith a first set of impression parameters including a first User ID parameter specifying a first User ID parameter value; identifying, at the ad server, the first User ID parameter value associated with the first ad impression; dynamically determining, using the first User ID parameter value, a first floor value representing a first minimum auction closing price for use in a first ad auction relating to the first ad impression; conducting, at the ad server, the first ad auction using the first floor value; receiving, at the ad server, a first bid in connection with the first ad auction, the first bid having associated therewith a first bid value; comparing, at the ad server, the first bid value and the first floor value; rejecting the first bid if it is determined that the first bid value is less than the first floor value; receiving, at the ad server, a second ad request, the second ad request including information relating to a second ad impression to be displayed in connection with a display of the first web page at a second end user's device, the second ad impression having associated therewith a second set of impression parameters including a second User ID parameter specifying a second User ID parameter value; identifying, at the ad server, the second User ID parameter value associated with the second ad impression; dynamically determining, using the second User ID parameter value, a second floor value representing a second minimum auction closing price for use in a second ad auction relating to the second ad impression; conducting, at the ad server, the second ad auction using the second floor value; receiving, at the ad server, a second bid in connection with the second ad auction, the second bid having associated therewith a second bid value; comparing, at the ad server, the second bid value and the second floor value; and; rejecting the second bid if it is determined that the second bid value is less than the second floor value.

Additional method(s), system(s) and/or computer program product(s) may be further operable to cause at least one processor to execute additional instructions for: identifying the first set of impression parameters to include a first Site ID parameter identifying the first website; identifying the second set of impression parameters to include a second Site ID parameter identifying the first website; wherein the dynamic determining of the first floor value includes dynamically determining the first floor value using both the first User ID parameter value and the first Site ID parameter; and wherein the dynamic determining of the second floor value includes dynamically determining the second floor value using both the second User ID parameter value and the second Site ID parameter.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

FIG. 1 illustrates a simplified block diagram of a specific example embodiment of an Electronic Data Network 100. As described in greater detail herein, different embodiments of Advertising Networks may be configured, designed, and/or operable to provide various different types of operations, functionalities, and/or features generally relating to advertising technology.

According to different embodiments, at least some Advertising Network(s) and Advertising System(s) disclosed herein may be configured, designed, and/or operable to provide a number of different advantages and/or benefits and/or may be operable to initiate, and/or enable various different types of operations, functionalities, and/or features, such as, for example, one or more of those described and/or referenced herein.

According to different embodiments, at least a portion of the various functions, actions, operations, and activities performed by one or more component(s) of the Electronic Data Network may be initiated in response to detection of one or more conditions, events, and/or other criteria satisfying one or more different types of minimum threshold criteria, such as, for example, one or more of those described and/or referenced herein. Further, according to different embodiments, at least a portion of the various types of functions, operations, actions, and/or other features provided by the various system(s) and component(s) of the Electronic Data Network may be implemented at one or more client systems(s), at one or more server systems (s), and/or combinations thereof.

According to different embodiments, the Electronic Data Network 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Electronic Data Network may include one or more of the following types of systems, components, devices, processes, etc. (or combinations thereof):

Advertising Service Provider (Ad Server) System(s) 120, which, for example, may be operable to perform and/or implement various types of ad server functions, operations, actions, and/or other features such as those described or referenced herein.

Publisher/Content Provider Servers(s) 140, which, for example, may be configured or designed to render and provide access to various internet-based web sites, web pages, etc.

Client Computer System (s) 130.

Demand Partners/Advertising Networks 150, which, for example, may be operable to serve or supply ads, such as demand side partners (DSP), ATDs, RTB networks, mobile advertising networks (e.g., Adnet, S2S), ad campaign networks, trading desks and advertisers, such as Ford, Proctor & Gamble, and Coca-Cola.

Internet & Cellular Network(s) 110.

Remote Database System(s) 180.

Remote Server System(s) & Service(s) 170, which, for example, may include, but are not limited to, one or more of the following (or combinations thereof):
- Content provider servers/services
- Media Streaming servers/services
- Database storage/access/query servers/services
- Financial transaction servers/services
- Payment gateway servers/services
- Electronic commerce servers/services
- Event management/scheduling servers/services
- Etc.

Mobile Device(s) 160.

etc.

According to different embodiments, the Advertising Service Provider System 120 may include one or more ad servers which may communicate directly and/or indirectly with other entities of the Electronic Data Network(s). One goal of Publisher(s)/Content Provider(s) 140 is to obtain the highest CPM price (i.e., cost per thousand ad impressions) for each of its advertising segments. One goal of the Demand Partners/Advertising Networks 150 is to serve online ads that reach as narrow and targeted an audience as possible (e.g., serve ads that are most effective). As illustrated in the example embodiment of FIG. 1, there is communication between Publisher(s)/Content Provider(s) 140 and Advertising Service Provider System 120 and communication between Advertising Service Provider System 120 and Demand Partners/Advertising Networks 150.

In at least one embodiment, Demand Partners/Advertising Networks 150 may include, for example, one or more of the following (or combinations thereof):
- Advertisers and/or ad serving entities who participate in real-time bidding or auctioning of ad impressions.
- API-based ad serving networks such as "Adnet" or Server-to-Server ("S2S"). In some embodiments, different API-based ad serving networks may be classified as either Beacon Based Counting (BBC) Networks or Server Side Counting Networks (Non BBC). Typically, a Server Side Counting Network only counts an impression (e.g., for CPM purposes) when the network responds with a valid creative. This may also be referred to as Server based counting (e.g., an impression is counted once the creative is returned). Alternatively, a Beacon Based Counting Network counts an impression when the creative is rendered (e.g., via use of a beacon). For example, in Beacon based Counting (BBC), an impression is counted by the network once the ad serving beacon is executed)

Generally, if the advertiser/ad serving entity is assured that their ad will be seen by the right audience, the advertiser/ad serving entity would be willing to pay more for placing the ad. One role of Advertising Service Provider System 120 is to facilitate reaching both these goals by acting as an ad serving broker between the two entities (e.g., Publisher(s)/Content Provider(s) 140 and Demand Partners/Advertising Networks 150).

Some publisher(s) and/or content provider(s) may desire to exercise more control in determining minimum (floor) e-CPM prices for their online advertising spots. Additionally, some publisher(s) and/or content provider(s) may desire to create, carve out, and/or allocate specific ad space inventory buckets. For example, an online publisher or content provider may have 100 ad spots that it wants to fill. A certain number of the spots, for example 40, are on web pages that are most likely viewed by viewers who earn above $80,000 annual income, live in metropolitan areas in the U.S., and may be either male or female. Another 35 spots are likely to be viewed by people between the ages of 18-35 who are interested in sports. Another 23 spots are likely viewed by people ages 55-70, male or female, and interested in travel, and so on. Of course, many more categories can be used to describe these buckets and they can be much more specific. Some publisher(s) and/or content provider(s) may desire to set a floor e-CPM for each bucket. The floor e-CPM for ad segments associated with the first bucket described in the above example (e.g., male or female viewers who earn above $80,000 annual income, live in metropolitan areas in the U.S.) may be higher than the floor e-CPM for ad spots associated with the second bucket (e.g., viewed by the 18-35 year old sports enthusiasts). The Publisher(s)/Content Provider(s) may be provided with the ability to exercise fine grained control over the pricing of their respective ad spots. For example, an online publisher or content provider may set floor e-CPMs which are more economically feasible for advertisers and/or may set floor e-CPMs which advertisers are more willing to pay.

From the advertiser/ad serving entity perspective, giving the Publisher(s)/Content Provider(s) more control over ad serving is also more appealing. An advertiser/ad serving entity such as Nike would be more willing to pay a higher floor e-CPM for placing an ad that is more likely to be viewed by people interested in sports and are of a certain age range. Similarly, a luxury brand advertiser/ad serving entity is also more likely to pay a higher e-CPM for placing an ad on a page that is more likely to be viewed by male or female viewers having a high annual salary, are between certain ages, and live in metropolitan areas where the luxury brand has stores. There is a wide variety of such advertiser/ad serving entities catering to audiences or markets having a specific demographic or socio-economic background, and having other characteristics. Accordingly, publisher(s) and/or content provider(s) may desire to create different tiers or types of advertising buckets, each with its own respective floor e-CPM that can cater to each of these groups.

However, because it may not be practical or desirable for Publisher(s)/Content Provider(s) to communicate directly with Advertiser/Ad Serving Entities to obtain the highest e-CPM floor price that the market is willing to pay, advertising service providers (such as, for example, Advertising Service Provider System 120) may be employed to facilitate communication between the Publisher(s)/Content Provider(s), web page viewer (e.g., client/mobile system end user), and the Advertiser(s)/AD Serving Entities. Some of the more larger and well-known Publishers/Content Providers may also set floor e-CPMs for specific advertiser/ad serving entities who are associated with specific Agency Trading Desks (ATDs) and/or Demand-Side Platforms (DSPs) that would like to advertise to certain users which match specific demography and geography characteristics. For example, if a user is female, between the ages of 25-35 and lives in London, the Publisher(s)/Content Provider(s) will ask for a lower e-CPM if the advertiser/ad serving entity is Nike and is through DSP1 and an even lower e-CPM if it is Nike through DSP2.

As is well known in the industry, an ad is served after a user has downloaded a Web page into the web browser of the end user's computer or mobile device. The code comprising the Web page (most often HTML) is executed by the browser and the ads are served to the end user's computing device from the ad source. In at least one embodiment, the entity serving the ad may be the Advertising Service Provider System 120 which receives it from one or more Demand Partners/Advertising Networks 150. When the viewer goes to a web site or web page, and the HTML for the site is executed in the end user's browser, the end user's user identifier information is available to the publisher/content provider. In at least one embodiment, the user identifier information may be defined to include information which may be used to uniquely identify a specific user or a collection of users. A variety of different methods and/or techniques may be used to identify, acquire and/or store the user identifier information in one or more user identifier information files. An example of one type of user identifier information file is a cookie (also known as an HTTP cookie, web cookie, or browser cookie). The user identifier information file (herein, "UII File") is interpreted by the code in the publisher/content provider's web page and then an HTTP call is made to the Advertising Service Provider System with certain UII File parameters. Certain information in the UII File is used by the publisher/content provider and the Advertising Service Provider System to enable serving the most appropriate ad for the ad segments on the web page(s) being loaded on the end user's computing device. In one embodiment, this information may include a user ID (UID) and a system ID (SID), as well as other information described and/or referenced herein.

In at least one embodiment, the Advertising Service Provider System may be operable to utilize and/or generate various different types of data and/or other types of information when performing specific tasks and/or operations. This may include, for example, input data/information and/or output data/information. For example, in at least one embodiment, the Advertising Service Provider System may be operable to access, process, and/or otherwise utilize information from one or more different types of sources, such as, for example, one or more local and/or remote memories, devices and/or systems. Additionally, in at least one embodiment, the Advertising Service Provider System may be operable to generate one or more different types of output data/information, which, for example, may be stored in memory of one or more local and/or remote devices and/or systems. Examples of different types of input data/information and/or output data/information which may be accessed and/or utilized by the Advertising Service Provider System may include, but are not limited to, one or more of those described and/or referenced herein.

According to specific embodiments, multiple instances or threads of the Advertising Service Provider System may be concurrently implemented and/or initiated via the use of one or more processors and/or other combinations of hardware and/or hardware and software. For example, in at least some embodiments, various aspects, features, and/or functionalities of the Advertising Service Provider System may be performed, implemented and/or initiated by one or more of the various systems, components, systems, devices, procedures, processes, etc., described and/or referenced herein.

In at least one embodiment, one or more Advertising Service Provider Systems may access and/or utilize information from one or more associated databases. In at least one embodiment, at least a portion of the database information may be accessed via communication with one or more local and/or remote memory devices. Examples of different types of data which may be accessed by the Advertising Service Provider System may include, but are not limited to, one or more of those described and/or referenced herein.

According to different embodiments, various different types of encryption/decryption techniques may be used to facilitate secure communications between devices in Advertising Service Provider System(s) and/or Advertising Service Provider System(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

It will be appreciated that the Electronic Data Network of FIG. 1 is but one example from a wide range of Advertising Network embodiments which may be implemented. Other embodiments of the Electronic Data Network (not shown) may include additional, fewer and/or different components/features that those illustrated in the example Advertising Network embodiment of FIG. 1.

Generally, the advertising techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the advertising techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
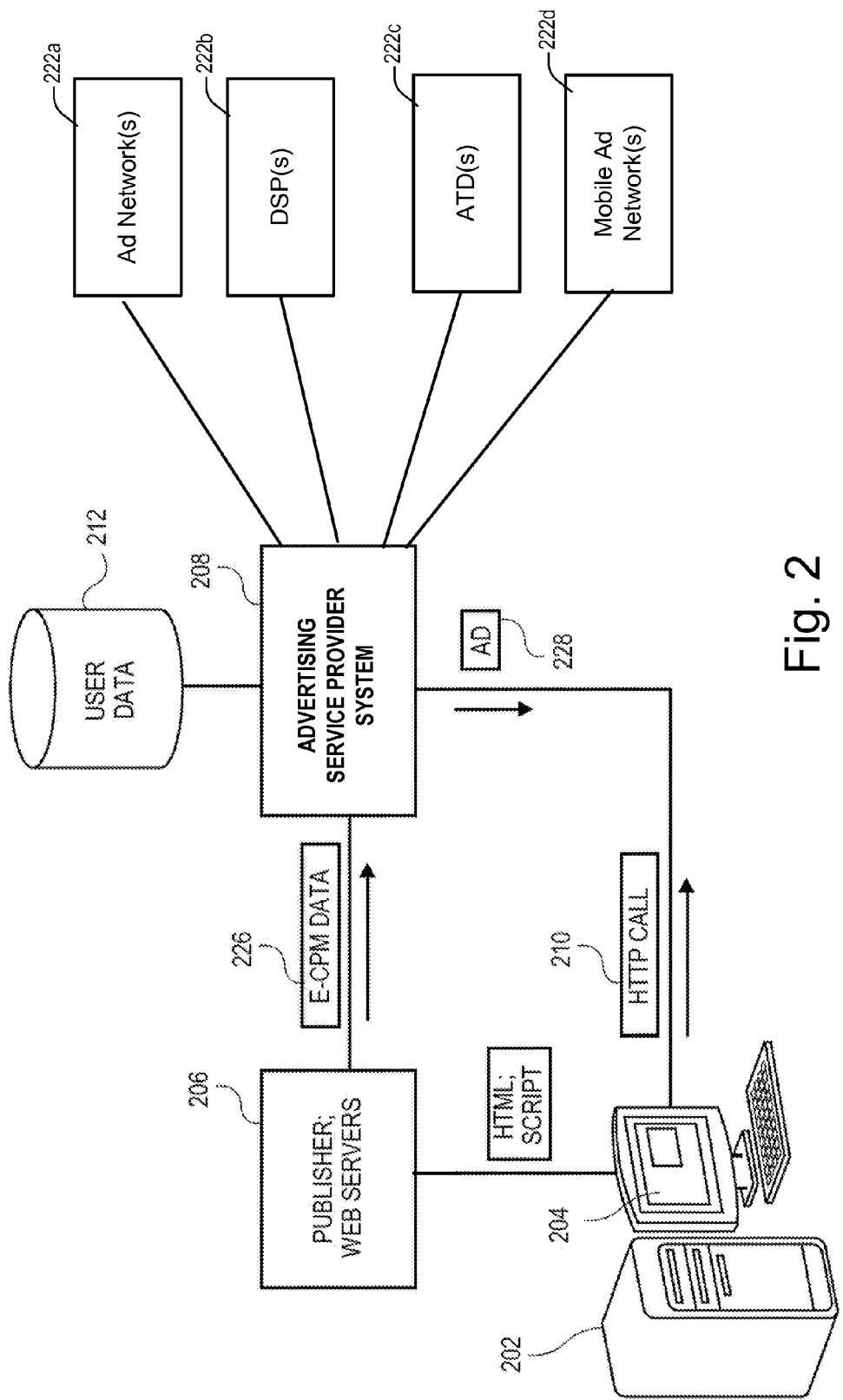
FIG. 2 is a block diagram showing an example embodiment of entities and interactions for implementing various aspects of the online advertising techniques disclosed herein.

FIG. 2 is a block diagram showing an example embodiment of entities and interactions for implementing various aspects of the online advertising techniques disclosed herein. The example embodiment of FIG. 2 shows a user computing device 202 executing a browser 204. The user goes to a certain Web site 206, for example, a blog about traveling. Code for displaying the Web site executes in the user's browser 204. In the code there is a script for displaying an ad. The ad is served by an advertising service provider 208. An HTTP call 210 is made from user computing device 202 to advertising service provider 208 that contains a UID and an SID. The advertising service provider uses the SID and UID to retrieve information on the user. The advertising service provider may have data on more than 500 million unique users (individuals). The data it has on the individuals includes age range, gender, preferences, demographic information, geographic location, socio-economic data (e.g., income, nationality, race, etc.), among other data. The advertising service provider databases 212 may be indexed by UID to obtain user or segment data. This data is searched in real time. In one embodiment, the publisher's Web page may be held until the look-up and ad bidding is done. The Web page is displayed when an ad has been selected and is available to be served and displayed with the Web page.

The advertising service provider then places the ad spot for real-time bidding (RTB) (that is, it starts a bidding process) among various selected Advertising Networks, which, for example, may include, but are not limited to, one or more of the following (or combinations thereof): Ad Network(s) 222a, Demand Partners (DSPs) 222b, Agency Trading Desks (ATDs) 222c, Mobile Ad Network(s) 222d, and/or other types of advertisers.

In some embodiments, audience segment level and ad type level may be used to derive permutations that can be used by publisher 206 to set floor e-CPMs. For example, these bidders may be notified that there is an ad spot available on a travel blog Web site that is being viewed by a user, for example, in the 45-55 age range, living in San Francisco, male, Asian, has an annual income above $55,000, and so on.

There are numerous types of data that can be offered about the user. The advertising service provider 208 may also state some requirements of the publisher 206, such as the quality of the ad (pixels, creatives, etc.). The advertising entities (214-224) can then bid on the spot. One desirable objective may be to obtain a match between user demographic data and features with an ad spot on the Web page. The publisher is able to set floor e-CPMs on numerous permutations of which a few basic examples are described here. A person of skill in the art of online ad serving would know how to take the controls and preferences and create many other types of permutations and appropriate floor e-CPMs. There are also relationships that the publisher may have with DSPs, ATDs, etc. that can be used to set floor e-CPMs.

Typically, it is not efficient for most publishers to directly deal with advertisers or DSPs (or other ad serving entities), since publishers typically do not have the desire or capability to deal with 50 or a 100 ad serving entities and thousands of advertisers in real time to serve ads at e-CPMs that are acceptable to both sides. As a result, publishers typically rely upon ad service providers (e.g., ad servers) to facilitate this process.

Various aspects of advertising service provider techniques are described herein for enabling online publishers and content providers to have more granular control over setting e-CPM floor prices for ads served on their web sites and related web pages. In one embodiment, a Floor Rule Engine can be implemented, for example as a module of a system (referred to herein as an Advertising Service Provider Private Marketplace), which allows the publisher to set floor pricing at a granular level. The Floor Rule Engine allows the publisher to set the e-CPM floor price using any combination of different entities. Each such parameter is referred to as a rule. Rules can be prioritized as desired.

Without the advertising service provider, the publisher would not be able to effectively use these controls or use them at all to set e-CPM floors. However, this is now possible because the publisher has the benefit of the advertising service provider's ability to get a profile of the user/audience viewing the Web site in real-time. Finally, the ad 228 by the winning ad serving entity is served to user Web browser 204 and displayed in the Web page which can then complete loading.

As noted above, the number of parameters and categories that may be used to sell online ads has increased significantly. The advertising service provider is able to obtain and has stored massive amounts of data on hundreds of millions of users in its databases. Because of this large volume of data on users that is now available, the advertising service provider can enable the publisher a level of control in filling its ad spots that was previously not available. This information can be searched and the bidding process can occur as a Web page is loading. Once an ad has been selected (i.e., there is a winning bid), the ad is served by the advertising service provider to the user's browser and displayed on the Web page. That user is now presented with an ad that is very likely of high interest to him or her.

Figure 3:
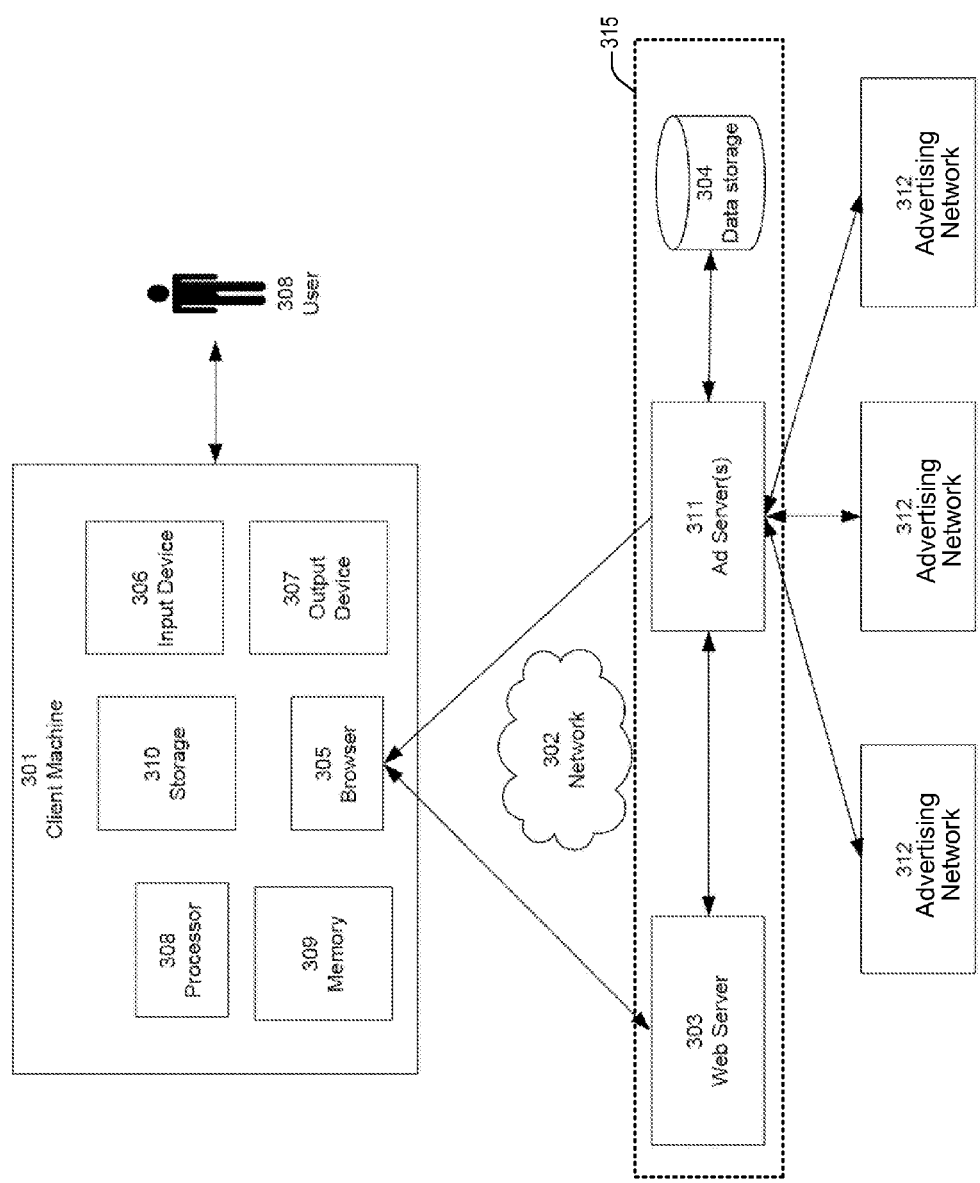
FIG. 3 is a block diagram depicting an overall architecture for implementing various aspects of the online advertising techniques disclosed herein.

FIG. 3 is a block diagram depicting an overall architecture for implementing various aspects of the online advertising techniques disclosed herein. As illustrated in the example embodiment of FIG. 3, client machine 301 communicates with Advertising Service Provider System 315 across a network 302 such as the Internet, using well known protocols for such network communications. Client machine 301 can be a personal computer, computing device, or other electronic device such as a kiosk, telephone, cellular telephone, hand-held computer, personal digital assistant, or the like. Client machine 301 includes, in one embodiment: processor 308; memory 309; storage 310; input device 306 such as a keyboard, mouse, touchpad, or the like; output device 307 such as a display screen; and other hardware components as are well known for computing devices and/or other electronic devices. Client machine 301 may run an operating system such as Microsoft Windows Vista, available from Microsoft Corporation of Redmond, Wash., or any other suitable operating system.

In one embodiment, browser software 305 runs on client machine 301 enabling user 308 to view content and interact with web pages available on the World Wide Web and delivered to client machine 301 via network 302. One example of browser 305 is Microsoft Internet Explorer, available from Microsoft Corporation of Redmond, Wash.

In one embodiment, an Advertising Service Provider System 315 may include web server 303, ad server 311, data storage 304, etc. in one embodiment, ad server 311 may be configured or designed for selecting an appropriate advertisement to be shown to user 308 along with the content provided by web server 303. According to different embodiments, ad server 311 may be configured as a single component or a plurality of separate components running at a single location or at one or more remote locations. Using browser 305, user 308 requests a web page from web server 303. Web server 303 may generate and send an ad request to ad server 311. The ad request may include a request for ad server 311 to provide an ad for placement with or alongside the content being provided to browser 305. As described in more detail below, ad server 311 makes a determination as to which Advertising Network(s) 312 the ad should be requested from. Additional parameters may form part of the ad request, so that the selected Advertising Network(s) 312 may each identify and provide one or more appropriate ad candidates based on context, user 308 characteristics, and/or other factors. According to different embodiments, the ad server 311 may obtains such information from data storage 304 and/or from one or more remote servers.

In at least one embodiment, the ad server 311 may send out one or more ad solicitation requests (herein referred to as "calls" or "hops") to one or more Advertising Network(s) 312 in order to solicit and select (from the various solicited Advertising Networks) the most preferred ad for filling the ad request.

In one embodiment, the Advertising Network 312 associated with the selected ad transmits the ad (or an identification of the ad) to ad server 311, and ad server obtains the ad and transmits it to browser 305 for display to user 308. In another embodiment, ad server 311 transmits the ad to web server 303, which integrates the ad with requested content and sends the integrated content to browser 305. In yet another embodiment, Advertising Network 312 transmits the ad to browser 305 without relaying it through ad server 311. Whichever mechanism is used, the selected ad is displayed at output device 307 alongside requested content from web server 303.

The publisher of content at web server 303 can be compensated for the ad placement based on the relative effectiveness of the ad. Accordingly, it is advantageous for the ad selection process to yield ads that are more likely to be effective for a given user 308. In at least one embodiment, ad server 311 may be configured or designed to make an optimal selection among Advertising Networks 312 so as to more effectively deliver ads that are of higher value.

Figure 4:
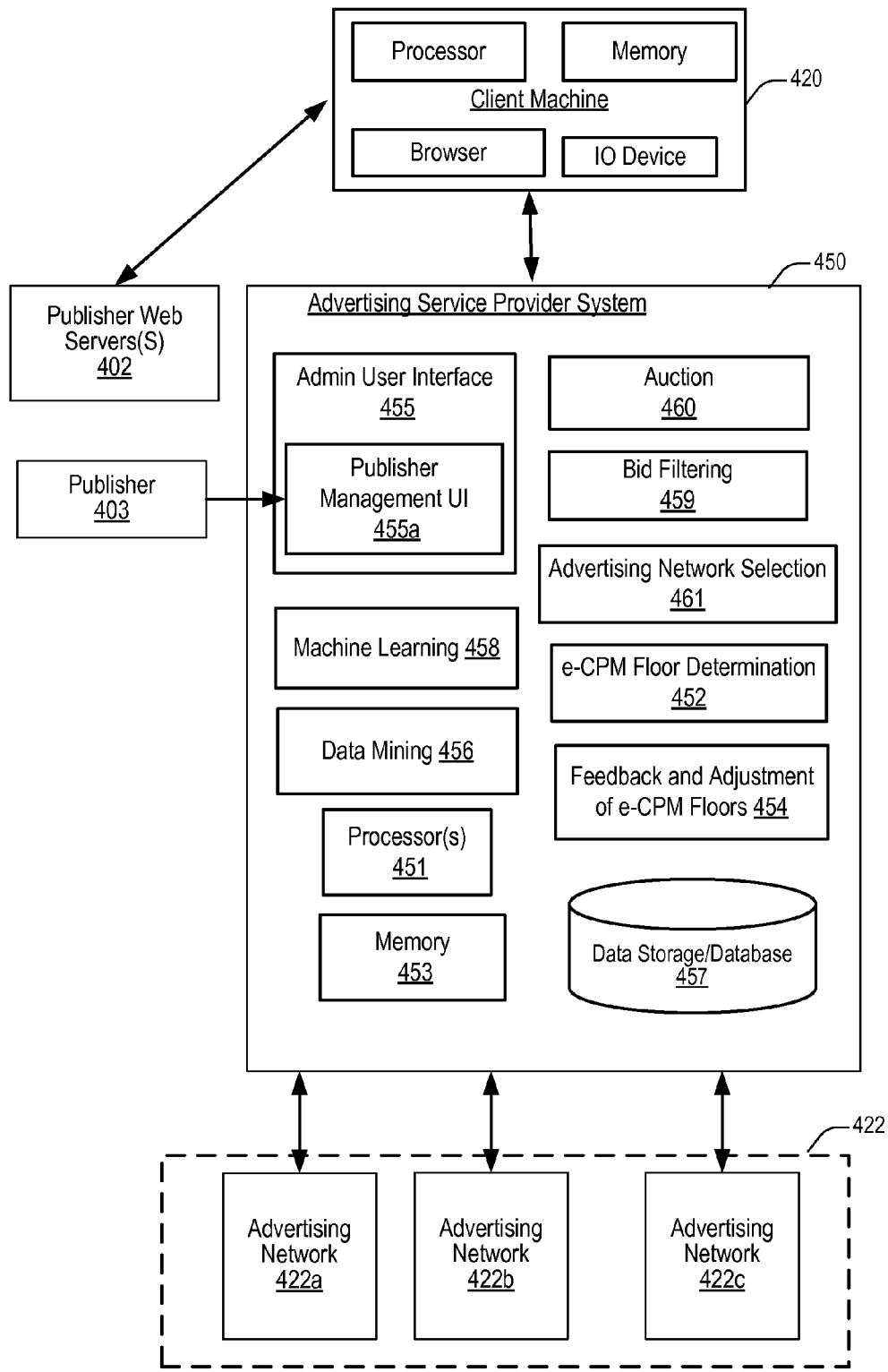
FIG. 4 is a block diagram showing additional details of an Advertising Service Provider System in accordance with a specific embodiment.

FIG. 4 is a block diagram showing additional details of an Advertising Service Provider System 450 in accordance with a specific embodiment. As illustrated in the example embodiment of FIG. 4, the Advertising Service Provider System 450 includes hardware components, such as one or more processor(s) 451, memory components 453, and data storage/database component(s) 457. Additionally the Advertising Service Provider System 450 includes software modules to support an auction process for impressions which the Advertising Service Provider System is servicing. The Advertising Service Provider System may include data mining components 456 and machine learning components 458, which, for example, may be configured or designed to analyze historical auction data, and to dynamically adjust procedures and policies for computing e-CPM floor values. A publisher management UI 455a may be included as part of an admin user interface 455. In one embodiment, admin user interface 455 may be configured or designed to allow administrator access to view data, make manual overrides to the algorithms or processes, set any specific parameters, and/or to manage and control the operation of Advertising Service Provider System 450 and/or one or more of its components.

In some embodiments, one or more of the components of the Advertising Service Provider System may be implemented as a processes and/or components which may be separate and/or external to the Advertising Service Provider System, and which may be configured or designed to operate independently and/or asynchronously from the ad server.

An auction module 460 is provided to support real time bid (RTB) auction(s) for individual ad segments which are solicited from selected demand partners/Advertising Networks. For individual ads, one objective of publisher 403 is typically to obtain the highest e-CPM price for each of its advertising segments within the constraints of the rules of the particular auction method being employed. Over the course of an ad campaign, many individual impressions are auctioned such that a publisher may desire a minimum average goal e-CPM.

In at least one embodiment, a goal e-CPM may be established by the ad server. In one embodiment, the goal e-CPM may correspond to a desired minimum average over many served impressions. For example, the publisher may want at least $2 e-CPM, on average, as a goal. This goal e-CPM may be defined over some relevant campaign definition, such as a period of time (e.g., one month). However, it will be understood that other campaign definitions may be used to define an average goal, such as an average e-CPM over a total number of impressions served. In at least one embodiment, a minimum average goal objective may be set. However, in some embodiments, the ad server may adjust the short term e-CPM of acceptable winning bids to include bids below the goal e-CPM for objectives such as maximizing revenue or fill rate.

In at least some embodiments, the ad server may include an e-CPM goal module which may be configured or designed to determine e-CPM goal values. In one embodiment, an e-CPM goal may be determined based on an average e-CPM for a given campaign, which, for example, may be measured be over a period of time or number of impressions served. In some embodiments, the publisher may set e-CPM goal objectives or factors. This may include an overall (minimum) goal e-CPM for a campaign. As examples, this may include an overall (minimum) goal e-CPM for a campaign and/or may include a goal e-CPM across all campaigns/Advertising Networks. Additionally, the e-CPM goal objectives may also be based on factors and/or targetable attributes such as, for example, geographic location of the user, user demographics, time of day, number of impressions, etc. For example, one goal e-CPM may be to achieve at least $2 e-CPM over the course of a one month campaign. It will also be understood that the goal e-CPM may be adjusted based on other factors, as desired.

As illustrated in the example embodiment of FIG. 4, the Advertising Service Provider System may include an e-CPM Floor Determination module 452 which may be configured or designed to determine a minimum floor e-CPM value for one or more incoming impression(s) which is/are to be serviced by the Advertising Service Provider System. This floor price may be set by the publisher, either in a fixed manner or using one or more guidelines or factors. In theory a hard floor value could be selected. However, more generally the floor e-CPM price may also be based on targetable attributes such as, for example, one or more of the following (or combinations thereof): geographic location of the user, user demographics, user ID, publisher ID, website ID, time of day, number of impressions, supply and demand patterns, etc. In one embodiment, the data mining module 456 and machine learning module 458 may be used to analyze data and determine supply and demand trends, and then adjust the floor e-CPM accordingly. Additionally, according to different embodiments, the floor e-CPM price may be continuously and/or periodically adjusted (e.g., dynamically and in real-time) based on supply and demand patterns. When bids arrive for an impression, a current e-CPM floor value may be retrieved from the e-CPM Floor Determination module 410, and may be used as one of the factors in filtering bids.

In some embodiments, the ad server may include a Bid Filtering module 459 which may be configured or designed to analyze (e.g., in real-time) received auction bids, and selectively identify and filter out bids which are determined not to satisfy the floor e-CPM value. In some embodiments, the Bid Filtering module 459 may also include functionality for filtering out bids that, if accepted, would reduce the average e-CPM below the goal e-CPM.

According to some embodiments, different floor e-CPM values may be determined for different types of floor e-CPM criteria. For example, supply and demand patterns and/or other factors may be used to dynamically determine a minimum floor e-CPM value below which no bid value will be accepted. In some embodiments, the floor e-CPM value may be tiered based, for example, on number of impressions and/ or other factors. For example, in one embodiment, a floor e-CPM price may be determined based on historical data, and may be adjusted over time based on supply and demand patterns.

Data mining 456 and machine learning 458 may, for example, detect long term, medium term, and/or short term trends in supply and demand to determine adjustments to the floor e-CPM to optimize revenue and/or to achieve other goals. For example, in a particular geographic area, supply and demand patterns may be correlated with time of day, day of the week, or other variables. For example, in one example scenario, analysis of historical data that may reveal a pattern that there is more demand, relative to supply, from advertisers on weekends for particular demographic (e.g., the advertisers may target consumers during their free time on weekends). By way of illustration, analysis of historical data may reveal that demand is low on a Friday afternoon such that all of the bids for an ad segment are below the goal e-CPM. There may also be data on current trends for the bid values, in additional to historical data. The data on temporal patterns and predicted and actual supply and demand may indicate that it is likely that bidding values will increase the next day. Statistical techniques or other modeling techniques may be used to determine optimum floor e-CPM values when the bid values are below the goal e-CPM. For example, if the floor value is chosen too low when bidding values are below the goal e-CPM, the average e-CPM may drop too early in the campaign. To safely optimize revenue and safely achieve the goal e-CPM for the campaign, it may be preferable that the floor e-CPM value be dynamically varied over time.

The minimum floor e-CPM may be adjusted continuously and/or periodically based on predicted and actual supply and demand patterns to safely optimize the different campaign objectives. Additionally, the frequency of the adjustment and the range of each adjustment may be based on historical patterns. Data analysis may be used to adjust the floor e-CPM value by taking into account the current average e-CPM, length of the campaign, and data trends that may change bidding values for different time periods of interest in the future. That is, historical data and supply and demand patterns may be used to adjust the floor e-CPM value to achieve desired objectives such as, for example, safely maintaining the average e-CPM at least equal to the goal e-CPM while achieving other objectives, such as optimizing fill rate and revenue.

In one embodiment, Advertising Service Provider System 450 may include an Advertising Network Selection component 461, which may be implemented as software running on a processor at server or on a different processor. The Advertising Network Selection component 461 may take into account various factors in determining which Advertising Network(s) 422 to select for a particular website or content page being presented. Non-limiting examples of such factors may include, but are not limited to, one or more of the following (or combinations thereof):

- site/page look and feel (including cascading style sheets (CSS), colors, themes, and the like): this information may also be used for customizing the layout of the ad and for selection of ad colors, in order to maximize the click-through ratio (CTR);
- geographic location of user, which, for example, may be used for geographic targeting of advertisements;
- subject matter or category (also referred to as the "vertical") of the site/page (such as gaming, technology, entertainment, news, etc.);
- user data, such as may be retrieved from a user identifier information stored at client machine;
- contextual data, such as keywords on the content page, which, for example, may be used for setting a bid price for advertisements;
- etc.

In some embodiments, the selection of desired Advertising Network(s) 422 may take into account Advertising Network data such as pricing data (e.g., e-CPM), frequency, and the like. In one embodiment, Advertising Network Selection component 461 makes use of data mining process 456 to extract relevant data. Data mining component 456 sends data to machine learning component 458 to analyze data for trends, and to revise prediction models based on new user and network data. Machine learning component 458 may generate decision parameters for use by Advertising Network Selection component 461, and may transmit such updated decision parameters to Advertising Network Selection component 461 to communicate changes in the prediction model. In one embodiment, data mining and machine learning may take place off-line, using data from Advertising Service Provider System 450. The results of these processes may be stored in a database such as database 457. According to different embodiments, machine learning component 458 and data mining component 456 may be implemented as part of Advertising Service Provider System 450, or as separate components.

Figure 5:
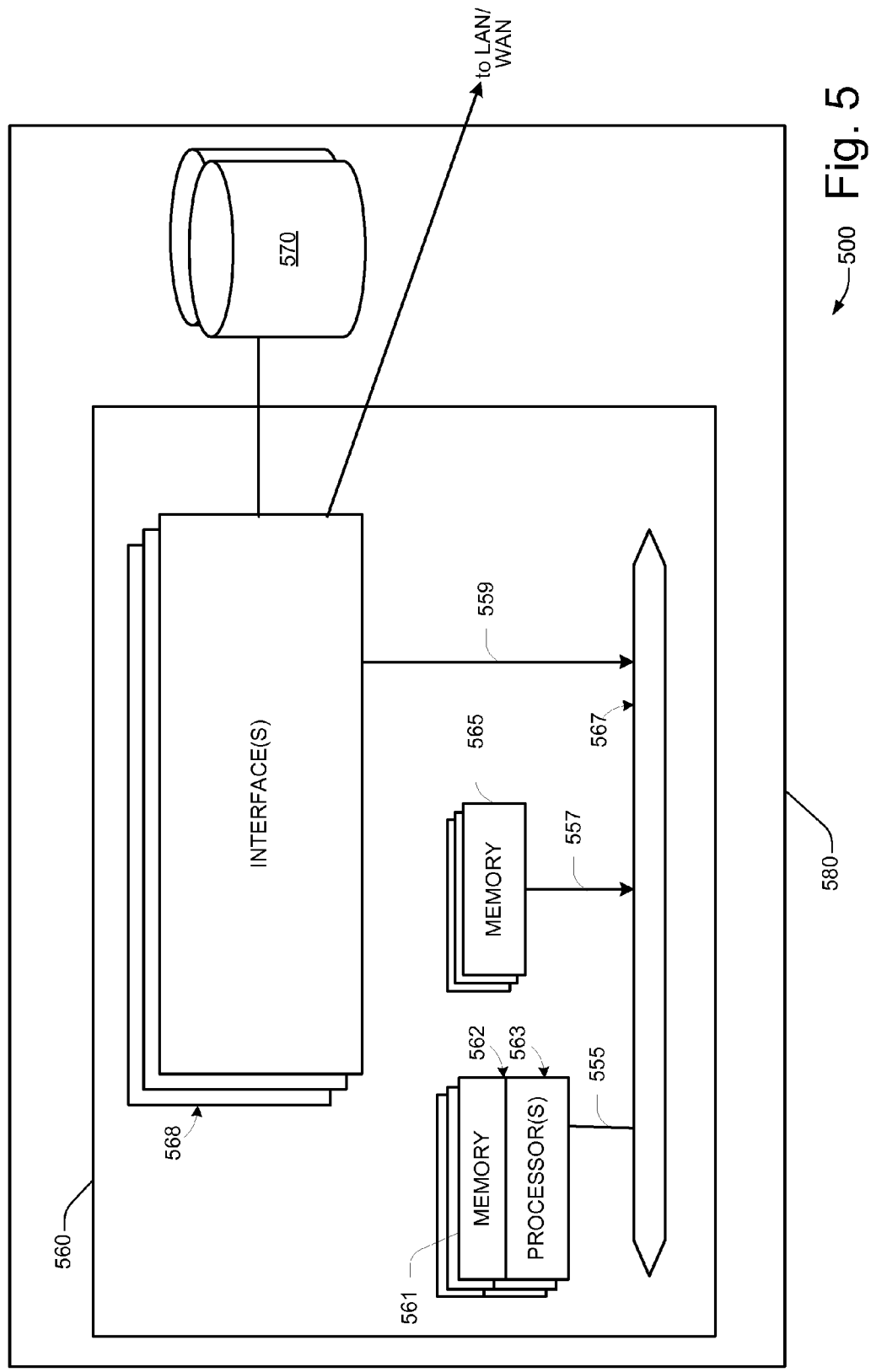
FIG. 5 illustrates an example embodiment of an ad server system which may be used for implementing various aspects/features described herein.

FIG. 5 illustrates an example embodiment of an ad server system 580 which may be used for implementing various aspects/features described herein, including at least some of the various ad serving and ad auctioning techniques described herein. In at least one embodiment, the ad server system 580 includes at least one network device 560, and at least one storage device 570 (such as, for example, a direct attached storage device, a local data storage device, etc.).

In at least one embodiment, storage device(s) 570 may be configured or designed to store historical data relating to ad requests and/or impressions which have been processed by the ad server system 580. In some embodiments, the storage device(s) 570 may also be configured or designed to store historical data relating to ad requests and/or impressions which have been processed by other ad servers of the Advertising Service Provider System. Other data and information may be stored at one or more of the storage device(s) 570 including at least a portion of the data, information, parameters and/or criteria disclosed herein. In some embodiments, the storage device(s) 570 may include appropriate hardware and/or software for implementing database management functionality for defining, creating, querying, updating, and administrating one or more databases.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software.

CPU 562 may include one or more processors 563 such as, for example, one or more processors from the AMD, Motorola, Intel and/or MIPS families of microprocessors. In an alternative embodiment, processor 563 may be specially designed hardware for controlling the operations of ad server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the ad server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™) 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the ad server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various ad serving and ad auctioning techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Examples of program instructions include both machine code, such as produced by a compiler, and files containing higher level code that may be executed by the computer using an interpreter.

Segment Based Floors for Use in Online Ad Auctioning Techniques

Various aspects described herein are directed to different techniques for enabling ad server systems to dynamically determine minimum e-CPM floor prices for individual incoming impressions, in which the determination of the minimum e-CPM floor value for a given incoming impression may be based upon the value(s) of specifically identified impression parameters associated with that particular impression.

As described previously, one or more ad servers disclosed herein may include functionality for supporting real time bid (RTB) auction(s) for individual ad segments which are solicited from selected demand partners/advertising networks. In at least some embodiments, the ad server's RTB auction may be implemented as a second price auction. In a second price auction, each bidder may place a separate bid, which, in some embodiments, may be undisclosed to the other participants in the auction. The highest bidder may be deemed to be the winner of the auction ("winning bidder"), and may be awarded the impression. In a second price auction, the winning bidder pays the price bid by the second-highest bidder. Such auctions work well when there are a sufficient number of bidders participating in the ad auction. However, when there are an insufficient number of auction participants (e.g., less than 5 participants), this ad auctioning technique may result in selling impressions at prices which are lower than actual fair market values.

As a platform, the ad server should preferably be able to serve impressions at an appropriate price based on the characteristics and parameters of each impression. Accordingly, in an effort to help prevent the ad server from selling impressions at less than fair market value prices, the ad server may determine and establish a dynamically configurable minimum "floor" price (e.g., minimum e-CPM floor value) below which no bid value will be accepted. In at least some embodiments, the determination of the minimum floor value (e.g., in real-time or non-real time) for a given incoming impression may depend on a number different of factors and parameters associated with that impression. For example, in one embodiment, the ad server and/or other component(s) of the Advertising Service Provider System may analyze historical data (e.g., relating to incoming impressions and/or ad requests which have previously been processed by the ad server (s)) to identify "consistent" users who have shown a consistent pattern of viewing specific websites. Using the analyzed information, different minimum floor values may be dynamically determined (e.g., by the ad server) based on "user-site" level criteria. In one embodiment, the user level criteria may be defined based on a user identifier (e.g., User ID parameter) which may be used to uniquely identify a given user associated with an identified incoming impression (e.g., who is viewing the web page where the ad impression will be displayed). In one embodiment, the site level criteria may be defined based on a Publisher ID parameter, a Site ID parameter, a Domain ID parameter and/or other parameter(s) which may be used to identify the website, web domain, and/or publisher that is associated with the identified incoming impression.

By way of example, in one example scenario, the Advertising Service Provider System may determine a first minimum floor value for an identified User-Site A (e.g., User A accessing Website A), may determine a second minimum floor value for an identified User-Site B (e.g., User B accessing Website A), may determine a third minimum floor value for an identified User-Site C (e.g., User A accessing Website B), may determine a fourth minimum floor value for an identified User-Site D (e.g., User B accessing Website B), etc.

For purposes of illustration, it is assumed that a minimum User-Site floor value has been established for an incoming impression (to be serviced by the ad server) which matches specific User-Site parameter criteria. In one embodiment, if the minimum User-Site floor value is below the second highest bid, the second highest bid may be used as the winning bid value, and the minimum User-Site floor value has no impact on the RTB ad auction. If the minimum User-Site floor value is between the first and second highest bids, then the minimum User-Site floor value may be used as the winning bid value (e.g., in place of the second highest bid). If the minimum User-Site floor value is above the highest bid, a default may occur (e.g., no bid is returned from the RTB ad auction).

In one embodiment, the calculation of the minimum floor value for an identified User-Site may be based on a specified percentage or fraction of the average of first price bids (e.g., average of highest bids) associated with impressions relating to that particular user which have previously been processed over a specified time interval (e.g., over the past 72 hours, over the past 4 days, etc.).

FIGS. 6-10 show various flow diagrams of different Ad Serving-related procedures in accordance with specific embodiments. According to different embodiments, at least a portion of the various types of functions, operations, actions, and/or other features provided by one or more of the Ad Serving-related procedures of FIGS. 6-10 may be implemented at one or more one or more server system(s) such as, for example, Advertising Service Provider System (120, FIG. 1), ad server (311) and/or combinations thereof.

In at least one embodiment, one or more of the Ad Serving-related procedures may be operable to perform and/or implement various types of ad serving functions, operations, actions, and/or other features such as one or more of those described and/or referenced herein. One or more of the Ad Serving-related procedures may also be operable to utilize and/or generate various different types of data and/or other types of information when performing specific tasks and/or operations. This may include, for example, input data/information and/or output data/information. For example, in at least one embodiment, one or more of the Ad Serving-related procedures may be operable to access, process, and/or otherwise utilize information from one or more different types of sources, such as, for example, one or more local and/or remote memories, devices and/or systems. Additionally, in at least one embodiment, one or more of the Ad Serving-related procedures may be operable to generate one or more different types of output data/information, which, for example, may be stored in memory of one or more local and/or remote devices and/or systems. Examples of different types of input data/information and/or output data/information which may be accessed and/or utilized by one or more of the Ad Serving-related procedures may include, but are not limited to, one or more of those described and/or referenced herein.

In at least one embodiment, a given instance of at least one of the Ad Serving-related procedures may access and/or utilize information from one or more associated databases. At least a portion of the database information may be accessed via communication with one or more local and/or remote memory devices. Examples of different types of data which may be accessed by one or more of the Ad Serving-related procedures may include, but are not limited to, one or more of those described and/or referenced herein.

According to specific embodiments, multiple instances or threads of one or more of the Ad Serving-related procedures may be concurrently implemented and/or initiated via the use of one or more processors and/or other combinations of hardware and/or hardware and software. For example, in at least some embodiments, various aspects, features, and/or functionalities of one or more of the Ad Serving-related procedures may be performed, implemented and/or initiated by one or more of the various systems, components, systems, devices, procedures, processes, etc., described and/or referenced herein. According to different embodiments, one or more different threads or instances of the Ad Serving-related procedures may be initiated in response to detection of one or more conditions or events satisfying one or more different types of minimum threshold criteria for triggering initiation of at least one instance of one or more of the Ad Serving-related procedures. Various examples of conditions or events which may trigger initiation and/or implementation of one or more different threads or instances of the Ad Serving-related procedures may include, but are not limited to, one or more of those described and/or referenced herein. According to different embodiments, one or more different threads or instances of the Ad Serving-related procedures may be initiated and/or implemented manually, automatically, statically, dynamically, concurrently, and/or combinations thereof. Additionally, different instances and/or embodiments of one or more of the Ad Serving-related procedures may be initiated at one or more different time intervals (e.g., during a specific time interval, at regular periodic intervals, at irregular periodic intervals, upon demand, etc.).

In at least one embodiment, initial configuration of a given instance of at least one of the Ad Serving-related procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of one or more of the Ad Serving-related procedures may correspond to and/or may be derived from the input data/information.

For purposes of illustration, it is assumed that instances of one or more of the Ad Serving-related procedures are running at an ad server of the Advertising Service Provider System (e.g., 120, FIG. 1).

Figure 6:
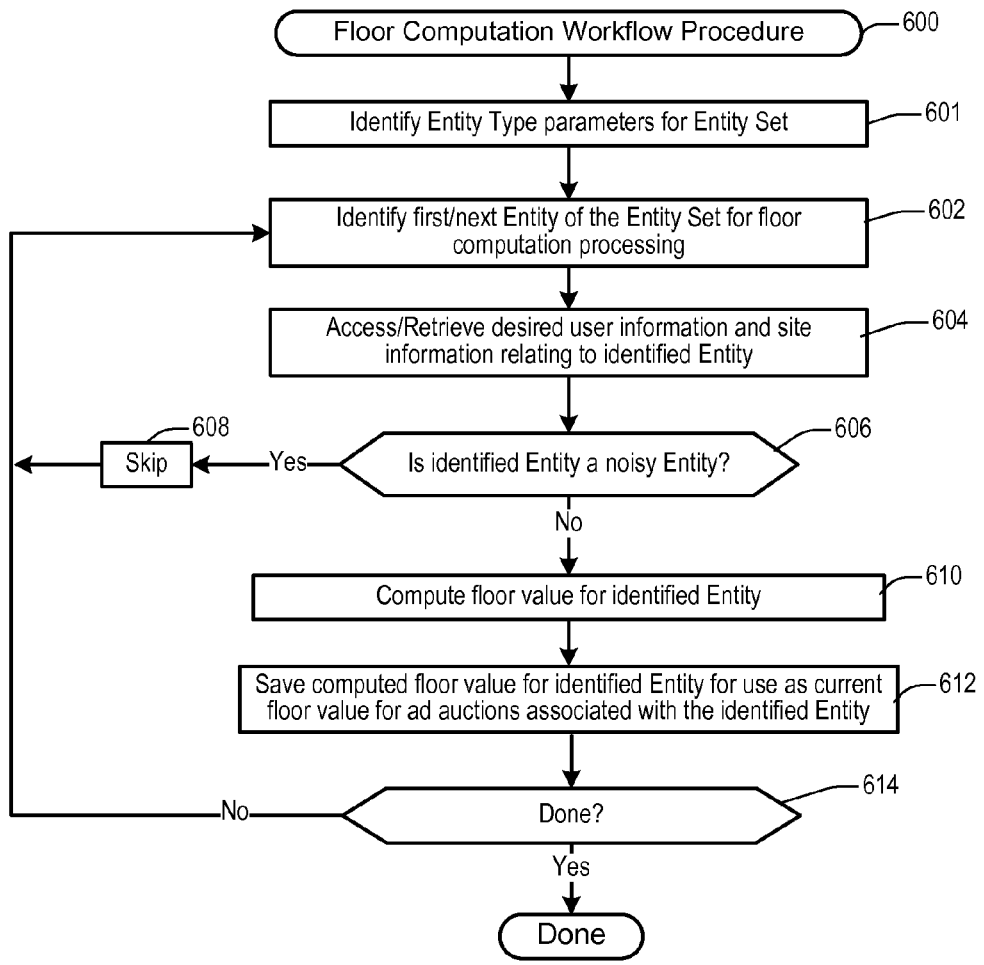
FIGS. 6, 7, 8A, 9, 10 show various flow diagrams of different Ad Serving-related procedures in accordance with specific embodiments.

FIG. 6 shows an example flow diagram of a Floor Computation Workflow Procedure in accordance with a specific embodiment. In at least one embodiment, the Floor Computation Workflow Procedure may be configured or designed to facilitate periodic calculation of minimum floor values for one or more designated Entity types (such as, for example, User-Site type Entities). According to different embodiments, the Floor Computation Workflow Procedure may be implemented at an ad server or other component(s) of the Advertising Service Provider System. According to different embodiments, the Floor Computation Workflow Procedure may be implemented asynchronously from one or more of the other Ad Serving-related procedures described and/or referenced herein.

In at least one embodiment, the Floor Computation Workflow Procedure may be initiated automatically at periodic intervals (e.g., once a day, once every 3 days, every other day, etc.) in order to periodically update the minimum floor value for a given set of Entities. In some embodiments, updating of the minimum floor value(s) may also be triggered based on detection of other events/conditions such as, for example, one or more of the following (or combinations thereof):

- Automatic detection of external events which may affect the market/liquidity (e.g., number of bidders participating in RTB ad auction), such as, for example:
  - Sudden surge in market demand'
  - Relevant event(s) which are historically known to affect market (e.g., Black Friday, Super Bowl, etc.).
- Manually initiated trigger.
- Regularly scheduled to run multiple times in a day.
- Based on drastic changes measured real time in critical performance metrics (e.g.; aggressiveness, fill rate, estimated revenue lift, etc.).

As shown at 601, Entity Type parameters may be identified for the Entity Set to be analyzed. For example, for purposes of illustration, it is assumed in the example embodiment of FIG. 6 that identified Entity Type parameters are the User ID parameter and the Site ID parameter, which collectively define the User-Site Entity Set. In one embodiment, the User-Site Entity Set may include a plurality of distinct User-Site Entities, wherein each User-Site Entity may be defined by a different combination of User ID-Site ID parameter values (e.g., User A-Site A, User A-Site B, User B-Site A, User B-Site C, etc.). In at least one embodiment, an Entity may represent or characterize any single/combination of parameters of an impression for which minimum floor criteria may be honored by the ad server. In other embodiments (not shown), other types of Entity Sets may be defined using various different Entity Type parameters such as, for example, one or more of the following (or combinations thereof):

- Audience Segment Information—For example, demographics of the end user who will be viewing the impression such as, for example, one or more of the following (or combinations thereof):
  - Gender,
  - Age,
  - Ethnicity,
  - Income classification
  - Interests
  - User ID
- Location information relating to where the impression will be displayed, such as, for example, one or more of the following (or combinations thereof):
  - Country,
  - State,
  - Province,
  - City,
  - GPS coordinates,
  - Zip code,
  - Region
  - DMA (designated market area—e.g., for US markets)
- Technical parameters associated with the device that will be displaying the impression such as, for example, one or more of the following (or combinations thereof):
  - Device make/model,
  - Operating system type,
  - Device display screen size,
  - Display screen resolution,
  - Browser type,
  - Smartphone model/type,
  - Screen resolution
- Time-related parameters, such as, for example, one or more of the following (or combinations thereof):
  - Hour of Day,
  - Date,
  - Day of the week,
  - Month,
- Geolocation of the end user;
- Site ID (Website ID);
- Domain ID;
- Webpage ID;
- Publisher ID;
- Ad size (e.g., size of ad to be displayed at end user device);
- Historical bid values;
- Historical click thru rates;
- Historical conversions (e.g., Cost per action);
- Context of the publisher page where ad will be displayed;
- Volume of impressions filled for end user (e.g., is the ad server handling sufficient number of impressions for the end user to enable the ad server to successfully predict (with relative certainty) which impressions are likely to be filled or go unfilled for that end user?);
- Consistency of user appearance (e.g., how consistently does an identified user visit a given website?)
- Frequency of user appearance (e.g., how frequently does an identified user visit a given website?)
- Etc.

For example, the Age parameter may be selected as the Entity Type parameter to thereby define an "Age" Entity Set which may include a plurality of distinct Age Entities, wherein each Age Entity may be defined by a different Age parameter value (e.g., Age 13, Age 25, Age 40, etc.). In another example, the User ID and Publisher ID parameters may be selected as the Entity Type parameters to thereby define a "User-Publisher" Entity Set which may include a plurality of distinct User-Publisher Entities, wherein each User-Publisher Entity may be defined by different combinations of User ID-Publisher ID parameter values (e.g., User A-Publisher A, User A-Publisher B, User B-Publisher A, User B-Publisher C, etc.). In another example, the Gender, Age, and Site ID parameters may be selected as the Entity Type parameters to thereby define a "Gender-Age-Site" Entity Set which may include a plurality of distinct Gender-Age-Site Entities, wherein each Gender-Age-Site Entity may be defined by different combinations of Gender-Age-Site ID parameter values (e.g., Male-25-Site A, Female-25-Site A, Male-40-Site B, Female-35-Site C, etc.). Examples of other Entity Sets may include, but are not limited to, one or more of the following: Site, Site-User-AdSize, Publisher-User-AdSize, etc.

In at least one embodiment, an Entity may represent the granularity at which the ad server (or other component of the Advertising Service Provider System) may group together a set of bids and set a floor value. In determining which specific Entity Type parameters to use for purposes of computing minimum floor values, it is preferable to select at least one parameter which provides a sufficient degree of granularity so as to allow the corresponding Entities of the Entity Set to be distinguished from each other with a suitable degree of granularity. Examples of various types of Entity Sets which satisfy such criteria may include, but are not limited to: User-Site, User-Publisher, User-Domain, and the like.

As noted above, it is assumed in the example embodiment of FIG. 6 that identified Entity Type parameters are the User ID and Site ID parameters, which collectively define the User-Site Entity Set. As shown at 602, a first (or next) Entity of the Entity Set (e.g., User-Site Entity Set) is selected for floor computation processing. For illustrative purposes, it is further assumed that the first User-Site Entity which is selected for floor computation processing is the Entity corresponding to: User A-Site A.

As shown at 604, selected User-Site information (which, for example, may include user-related information and/or site-related information) relating to the identified Entity (e.g., User A-Site A Entity) may be access and/or retrieved. In at least one embodiment, the user-related information and/or site-related information may be retrieved from historical ad-serving records (e.g., relating to previously processed ad requests and/or impressions) which have been stored at one or more local, remote, and/or distributed storage devices (e.g., 570, FIG. 5) at the ad server (and/or other component(s) of the Advertising Service Provider System). The retrieved historical information may include a logged data relating to RTB impressions served by the ad server, and may include various attributes as well as price points associated with each winning impression. For example, in one embodiment, the ad server (and/or other component(s) of the Advertising Service Provider System) may be configured or designed to identify a specific User-Site "Entity", and to fetch (e.g., from historical ad-serving logs) winning bid information relating to impressions (e.g., that have been processed in the past 72 hours) that are associated with the identified User-Site Entity.

In the present example, the accessed User-Site information may include historical information relating to recently filled impressions for the identified User-Site Entity (e.g., User A-Site A Entity) which have occurred over a specified time interval such as, for example, the past n days (e.g., where n is a value within the range of 1-30 days, preferably within the range of 2-5 days, such as n=3 days, or n=4 days). For example, if n=3 days, the ad server (and/or other component(s) of the Advertising Service Provider System) may search the historical ad-serving records to identify filled impressions within the past 3 days which were associated with Site A site and User A. This set of historical records may be referred to as a "User-Site Entity histogram". According to different embodiments, the different values of n may be based on different identified conditions, events, and/or parameters. For example, in one embodiment, the value of n may be determined on a site-level basis, resulting in different values of n being used in connection with different Site IDs. According to different embodiments the different values of n may be chosen on a Site-level basis. For example, the value n might be chosen for a site by studying user retention, consistency, etc., on the Site.

By way of illustration, if the User-Site Entity histogram identified a total of 10 filled impressions relating to the User-Site Entity over the past 3 days, winning bid data associated with the identified 10 impressions may be retrieved and analyzed for floor computation purposes. In at least one embodiment, the retrieved winning bid data may include, but is not limited to, one or more of the following types of data (or combinations thereof):

Date of impression.
Highest winning bid amount (note: for second price auctions, the highest winning bid amount may correspond to the first highest bid amount, even though the first highest bid amount was not the final auction price).
Time of impression.
Second bid price of impressions.
Etc.

As shown at 606, the Floor Computation Workflow Procedure may determine if the identified User-Site Entity is a noisy Entity. In at least one embodiment, a noisy Entity may correspond to an Entity for which there is an insufficient amount of historical data points to accurately calculate a floor value for that Entity for a specified time period (e.g., 3 days). This may be determined, for example, by accessing and/or retrieving historical ad-serving records relating to previously processed ad requests and/or impressions for the specified time period. According to different embodiments, there are a variety of different metrics and/or criteria which may be used for determining whether a particular Entity is a noisy entity, such as, for example, one or more of the following (or combinations thereof):

Volume of impressions filled for identified Entity (e.g., User-Site Entity) meets or exceeds predetermined threshold criteria during a specified time period or time interval (e.g., number of filled impressions associated with identified User is equal to or greater than 3 over the past 3 days).

Consistency of appearance for identified Entity (e.g., User-Site Entity) meets or exceeds predetermined threshold criteria during a specified time period or time interval (e.g., Consistency of Entity meets or exceeds n number of impressions per day over the past 4 days).

Number of days that the identified User has appeared on Site (e.g., Site A) meets or exceeds predetermined threshold criteria over a specified time period or time interval (e.g., User appears website at least once per day over the past 3 days);

Number of filled impressions the Entity has viewed (or has been displayed at User's system) meets or exceeds predetermined threshold criteria during a specified time period or time interval (e.g., 3 days, 4 days, etc.);

and/or other specified conditions, events, and/or parameters meeting or exceeding predetermined threshold criteria.

As illustrated in the example embodiment of FIG. 6, if it is determined that the identified User-Site Entity is a noisy Entity, the Floor Computation Workflow Procedure may skip (608) further processing of the identified User-Site Entity for floor computation purposes, and a next Entity from the Entity Set may be selected for floor computation analysis.

Alternatively, if it is determined that the identified User-Site Entity is not a noisy Entity, then the Floor Computation Workflow Procedure may proceed to compute (610) a floor value for the identified Entity. According to different embodiments, various techniques and/or procedures may be employed for computing floor values for one or more Entities, such as, for example, one or more of the following (or combinations thereof):

The floor value for a given User-Site Entity ("Floor Value (User-Site Entity)") may be computed based on a specified percentile ("p(site,segment)") (e.g., 5%, 8%, 10%, etc.) of the first (or highest) bid amounts received over a specified time interval (e.g., past 3 days) in connection with filled impressions relating to the User-Site Entity. In one embodiment, a segment may be defined to include non-overlapping and continuous intervals of winning bid prices. For example, if the average winning bids of two Entities comes in the same interval, then they may be classified as belonging to the same segment. In at least one embodiment, a different p(site,segment) values may be computed for different Entities. Additionally, in at least one embodiment, the p(site,segment) value for a given Entity may be automatically and dynamically adjusted or updated over time using various feedback procedures, such as, for example, the Floor Computation Parameter Feedback/Adjustment Procedure 1000 of FIG. 10.

Floor Value(User-Site Entity)=the lowest bid value of the User-Site Entity histogram, below which p percentage of total bids lie. For example, if B represents an array of all bids of the User-Site Entity histogram, sorted in increasing order, then the floor value of the User-Site Entity may be calculated according to:

Floor Value(User-Site Entity)=$B[\text{int}(p/100*\text{size}(B))]$

Calculating floor value using bid histogram of an identified Entity:
  Compute floor as min, mean, median, mode or max of the bids.
  Compute floor as average of winning bid (also referred to as highest winning bid amount or "first price") as well as second highest bid amount (also referred to as a "second price").
  Compute floor as the percentile of the histogram containing: second highest bid amounts and highest bid amounts.
  Compute floor as the average of lost bids.
Calculating floor value using a collection of multiple Users' data. In one embodiment, the group of users may be referred to as a "segment". One example technique of creating segments is by looking at the average value of the bids for one or more Users. In one embodiment, one or more floor values may be calculated based on combined data relating to bids (e.g., winning bids, second highest bids, and/or lost bids) associated with a segment of identified Users for a given Site. For example, according to different embodiments, the floor value(s) for the identified segment of Users may be calculated using one of the above-described "bid histogram" floor value calculation techniques. The computed floor value(s) may then be assigned to each identified User in that segment.

In the present example, different floor values may be computed for each non-noisy, User-Site Entity. In some embodiments, it may also be preferable to set a default floor value for a given User (or plurality of Users) which could be used for conducting ad auctions for any Site in which the User (or in which one of the plurality of Users) appear(s).

In at least some embodiments, after the desired Entity floor value calculations have been performed, the ad server (and/or other component(s) of the Advertising Service Provider System) may scale and/or adjust the computed floor value(s) using various techniques such as, for example, one or more of the following (or combinations thereof): normalized average number of bidders, average no of clicks, and the like. These additional factors may take account the demand for the impression and historical performance of the advertisements for specific Users.

In at least one embodiment, the computation of the floor value for the identified Entity may be implemented via execution of one or more appropriate procedures such as, for example, the Entity Floor Value Computation Procedure 800 of FIG. 8A, which is described in greater detail below.

Returning to the example embodiment of FIG. 6, as shown at 612, the computed (or updated) floor value for the identified Entity may be saved (e.g., at local storage) and may be set as a current floor value for use with ad auctions and impressions associated with the identified User-Site Entity.

As shown at 614, the Floor Computation Workflow Procedure may determine whether any additional floor value computations are to be performed for additional Entities of the identified User-Site Entity Set. If so, a next Entity (e.g., User B-Site A) of the User-Site Entity Set may be selected (602) for floor computation processing. The Floor Computation Workflow Procedure may continue this process until all desired Entities (e.g., all non-noisy Entities) of the User-Site Entity Set have been processed for floor computation processing.

According to different embodiments, one or more of the steps described with respect to FIG. 6 may be implemented serially and/or in parallel for a given Entity or for one or more group(s) of Entities. Similarly, one or more of the steps described with respect to each of the FIGS. 7-10 may be implemented serially and/or in parallel for a given Entity or for one or more group(s) of Entities.

For example, in one embodiment, the Entity floor values may be updated at the User-Site level once every day for a segment of Users who have visited the Site in the past x days (e.g., x=3). In some embodiments, the computed floor value for a specified User-Site Entity may be valid for only a limited time period (e.g., valid for 1 day, valid for 24 hours, etc.).

Additionally, in some embodiments, the ad server (and/or other component(s) of the Advertising Service Provider System) may be configured or designed to remove old or stale floor values from the system (e.g., those which were calculated more than 3 days from the current date). One example of this is illustrated and described with respect to FIG. 7.

Figure 7:
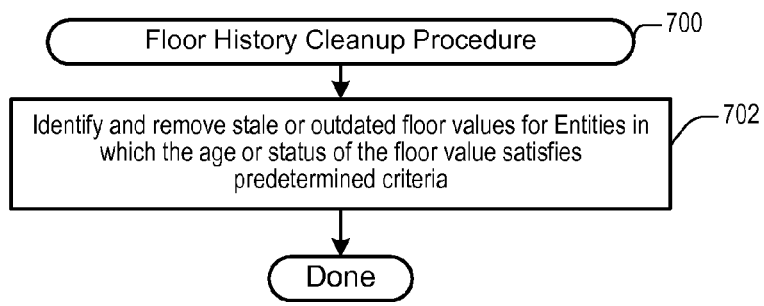

FIG. 7 shows an example flow diagram of a Floor History Cleanup Procedure in accordance with a specific embodiment. In at least one embodiment, the Floor History Cleanup Procedure may be configured or designed to facilitate removal of stale or outdated floor values from the system. According to different embodiments, the Floor Computation Workflow Procedure may be implemented at an ad server or other component(s) of the Advertising Service Provider System, and may be run asynchronously from one or more of the other Ad Serving-related procedures illustrated in FIGS. 6, 8, 9 and/or 10. In at least one embodiment, the Floor History Cleanup Procedure may be initiated manually and/or automatically at periodic intervals (e.g., every 12 hours, once a day, once every 3 days, every other day, etc.) in order to periodically update the minimum floor value for a given set of Entities. According to different embodiments, the Floor History Cleanup Procedure may be implemented asynchronously from one or more of the other Ad Serving-related procedures described and/or referenced herein. In some embodiments, execution of the Floor History Cleanup Procedure may be triggered based on detection of other events/conditions such as, for example, one or more of the following (or combinations thereof):

In at least one embodiment, when an instance of the Floor History Cleanup Procedure is executed, it may identify and remove (702) stale or outdated floor values for Entities in which the age or status of the floor value satisfies predetermined criteria. For example, in one embodiment, the Floor History Cleanup Procedure may be configured or designed to remove stale or outdated floor values for Entities (e.g., User-Site Entities) in which the age of the floor value (e.g., as measured from the time that the floor value was calculated) exceeds 3 days. The removal of stale/outdated floor values from the system helps to ensure that only the most current and relevant floor value criteria is utilized for servicing incoming impressions and/or conducting RTB ad auctions.

It will be appreciated that different embodiments of the Floor Computation Workflow Procedure may include additional features and/or operations than those illustrated in the specific embodiments of FIG. 6, may omit at least a portion of the features and/or operations of the Floor Computation Workflow Procedure, and/or may perform various steps, actions and/or operations in an order other than that illustrated in the specific example embodiment of FIG. 6. For example, in one alternate embodiment, the Floor Computation Workflow Procedure may implement the following sequence of actions/operations:

1. Look at past x days window of ad serving activity (e.g., x=3 or x=4).
2. Identify a filtered set of non-noisy User-Site Entities.
3. For each identified User-Site Entity, compute respective floor value at User-Site level.
4. Save and use the newly computed floor values at the system so as to enable the ad server (and/or other component(s) of the Advertising Service Provider System) to honor the newly computed floor values when servicing incoming impressions.

In at least one embodiment, the "honoring" the minimum floor values in RTB auctions may include performing one or more of the following activities and/or operations (or combinations thereof):

For each incoming impression, the ad server (and/or other component(s) of the Advertising Service Provider System) may identify the associated User ID and Site ID impression parameter values (if available), and determines whether a corresponding floor value is available for the identified User-Site combination.

If a floor value is available for the identified User-Site combination, then, depending upon the RTB bids received, use (honor) the floor value in accordance with the following rules and conditions:

Condition A: Floor is below second highest bid. In this case, the floor will be ineffective and normal second price auction may be conducted (e.g., using the second highest bid as the amount to be charged to the winning bidder).

Condition B: Floor is between first and second highest bid. In this case, the floor value is used as the second highest bid amount (e.g., the floor value is the amount to be charged to the winning bidder).

Condition C: Floor is above the first bid. In this case, since none of the bids are above the minimum floor value, this impression is filtered out from RTB auction, and the ad server (and/or other component(s) of the Advertising Service Provider System) may respond with a default.

If a floor value is not available for the identified User-Site combination, then a regular RTB auction may take place using the available bids from the DSPs.

It will be appreciated that, in at least some embodiments, use of Segment Based Floor technique(s) may be transparent to the winning bidder in embodiments where the bidders not provided with information relating to the other bids for a given RTB auction.

Figure 8A:
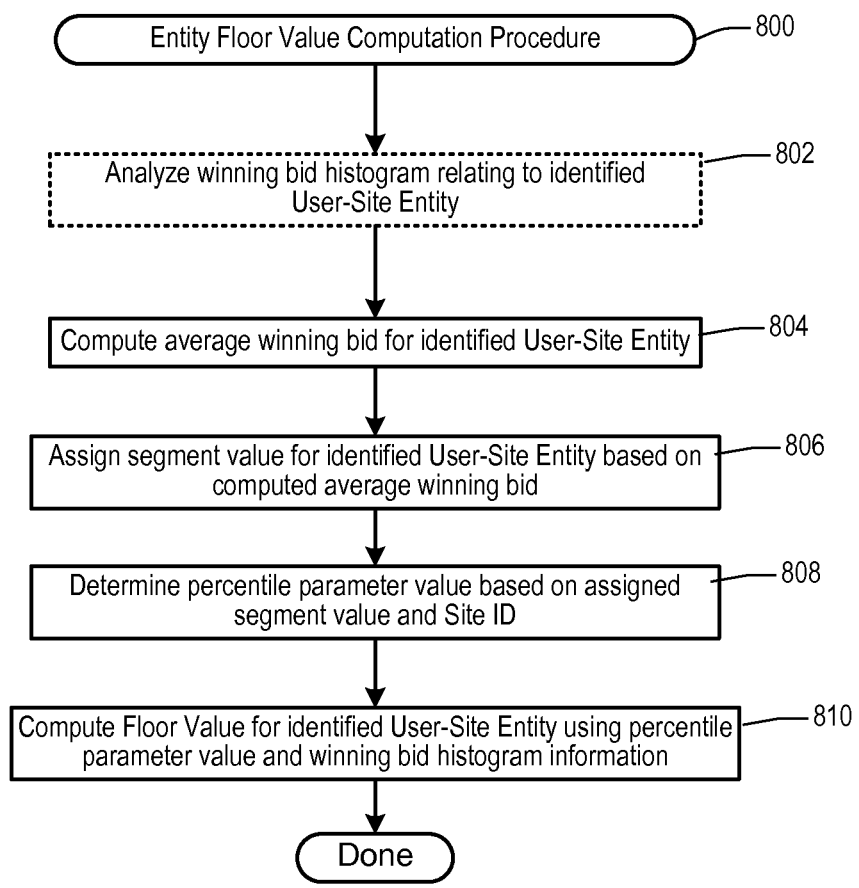

FIG. 8A shows an example flow diagram of an Entity Floor Value Computation Procedure in accordance with a specific embodiment. In at least one embodiment, the Entity Floor Value Computation Procedure may be configured or designed to facilitate calculation of new and/or updated floor values for one or more Entities. According to different embodiments, the Floor Computation Workflow Procedure may be implemented at an ad server and/or other component(s) of the Advertising Service Provider System. According to different embodiments, the Entity Floor Value Computation Procedure may be implemented asynchronously from one or more of the other Ad Serving-related procedures described and/or referenced herein.

In the specific example embodiment of FIG. 8A, it is assumed that an instance of the Entity Floor Value Computation Procedure has been initiated for computing a new (or updated) floor value for an identified User-Site Entity (e.g., such as that identified at 610 of FIG. 6).

As shown at 802, winning bid histogram data relating to the identified User-Site Entity may be analyzed. For example, in at least one embodiment, the user-related information and/or site-related information may be retrieved from historical ad-serving records (e.g., relating to previously processed ad requests and/or impressions) which have been stored at one or more local, remote and/or distributed storage devices (e.g., 570, FIG. 5) at the ad server (and/or other component(s) of the Advertising Service Provider System). The retrieved historical information may include a logged data relating to RTB impressions served by the ad server, and may include various attributes as well as price points associated with each winning impression. For example, in one embodiment, the ad server (and/or other component(s) of the Advertising Service Provider System) may be configured or designed to identify a specific User-Site "Entity", and to fetch (e.g., from historical ad-serving logs) winning bid information relating to impressions (e.g., that have been processed in the past 72 hours) that are associated with the identified User-Site Entity. In at least some embodiments, at least a portion of these operations and/or activities may be previously performed by other procedures executed at the Advertising Service Provider System, such as, for example, during execution of operation block 604 of FIG. 6.

As illustrated in the example embodiment of FIG. 8A, at 804 an average winning bid value may be computed for the identified User-Site Entity. In at least one embodiment, the average winning bid value may be calculated based on the analyzed winning bid histogram data relating to the identified User-Site Entity.

As shown at 806, a segment value may be assigned to the identified User-Site Entity based on the computed average winning bid. In at least one embodiment, site segments may be statically determined, for example, based on bid density of a given Site. Alternatively, site segments may be automatically and dynamically determined based on historical bid data and/or historical ad-serving logs.

For example, by way of illustration, the ad server (and/or other component(s) of the Advertising Service Provider System) may define a plurality of different Segments relating to the identified User-Site Entity, wherein each defined Segment may represent a different range of average winning bid values (e.g., highest or "first" bid values), such as, for example:

Segment A=$0-$4 average winning bid.
Segment B=$4.01-$6 average winning bid.
Segment C=$6.01-$8 average winning bid.
Segment D=$8.01+average winning bid.

In this particular example, it is assumed for purposes of illustration that the computed average winning bid for the identified User-Site Entity is $3.76. Accordingly, the assigned Segment value for the identified User-Site Entity may be Segment A since, for example, the computed average winning bid of $3.76 falls within the Segment A average winning bid range of $0-$4.

As shown at 808, a percentile parameter value for the identified User-Site Entity may be automatically and/or dynamically determined based, for example, on the assigned segment value (e.g., Segment A) and the Site ID parameter value (e.g., Site A) associated with the identified User-Site Entity. In at least one embodiment, the percentile value associated with a given Site-Segment may be initially determined based on an initial, default configuration parameter (e.g., each segment starts at 5%). Thereafter, floor feedback and adjustment mechanism(s) (such as, for example, the Floor Computation Parameter Feedback/Adjustment Procedure 1000 of FIG. 10) may be employed to automatically and dynamically adjust each respective percentile value (e.g., up/down) over time based on historical performance criteria.

In at least one embodiment, the ad server (and/or other component(s) of the Advertising Service Provider System) may store (e.g., at one or more local databases) and periodically update Site-Segment related information relating to a plurality of different Site-Segment entities and their associated Site-Segment percentile values. Table 1 below shows an example of at least a portion of the various Site-Segment related information which may be stored.

TABLE 1

| Site ID | Segment Value | Site-Segment Percentile |
|---------|---------------|-------------------------|
| Site A  | Segment A     | 5%                      |
| Site A  | Segment B     | 10%                     |
| Site A  | Segment C     | 15%                     |
| Site B  | Segment A     | 25%                     |
| Site B  | Segment A     | 7%                      |
| ...     | ...           | ...                     |

In the present example illustration, the ad server (and/or other component(s) of the Advertising Service Provider System) may identify the Site ID of the identified User-Site Entity as "Site A", and may identify the assigned User-Site Entity Segment Value as "Segment A". Using this information, the ad server (and/or other component(s) of the Advertising Service Provider System) may access the Site-Segment related information of Table 1 (above) and determine (808) that the percentile parameter value for the identified User-Site Entity is 5%.

As shown at 810, a floor value for identified User-Site Entity may be automatically and/or dynamically computed using the User-Site Entity percentile parameter value (e.g., 5%) and the User-Site Entity winning bid histogram information.

For example, in at least one embodiment, the ad server (and/or other component(s) of the Advertising Service Provider System) may determine the floor_e-CPM value at which the percentage of total User-Site Entity historical impressions (for a specified time period) are below (or equal to) the User-Site Entity percentile parameter value. Another way of expressing the calculation of the floor_e-CPM value is the e-CPM value at which the (cumulative number of historical User-Site Entity related impressions which have an associated e-CPM>floor_e-CPM) is greater than or equal to the ((total number of User-Site Entity related impressions)* (User-Site Entity percentile parameter value)). In one embodiment, calculation of the floor_e-CPM value for a given User-Site Entity may be determined according to:

Floor_e-CPM Value(User,Site)=e-CPM value at which: Cumulative_Sum{e-CPM(User,Site)}≥ (total_#_impressions{User,Site})*p_{Site,Segment}%), where:
cumulativeSum{e-CPM(User, Site)} represents the cumulative number of historical User-Site Entity related impressions which have an associated e-CPM>floor_e-CPM;

(total_#_impressions {User,Site}) represents the total number of User-Site Entity related impressions; and
p_{Site,Segment}% represents the User-Site Entity percentile parameter value.

By way of illustration, if the User-Site Entity percentile parameter value is determined to be 5%, and a total of 60 User-Site Entity related impressions were processed (e.g., by one or more component(s) of the Advertising Service Provider System) over the past 3 days, the User-Site Entity floor_e-CPM value may be computed by determining the e-CPM value at which no more than 3 impressions (e.g., 5% of 60) have an associated e-CPM value which is less than (or equal to) the floor_e-CPM value, based on the bids relating to the User-Site Entity historical impressions (over 3 days).

In at least some embodiments, the Floor Value for a given percentile p is the e-CPM value below which lies at most p percentage of impressions having lower first prices than the e-CPM value. To compute the Floor Value, the Advertising Service Provider System may iterate over a histogram of first prices in increasing order, keeping track of cumulative impressions. At a first price, if this total is becomes more than the p fraction of total impression. then the Floor Value may be computed to be equal to the first price—$0.01. If the cumulative total equals the p fraction of total impressions, then floor value may be computed to be equal to the first price.

To help illustrate various aspects relating to the computation of the floor_e-CPM value, reference is hereby made to the tables illustrated in FIGS. 8B and 8C.

FIGS. 8B and 8C show example data tables 850 and 860 which have been populated with sample data in order to help illustrate various aspects relating to the computation of floor_e-CPM values for a given User-Site Entity. More specifically, Table 850 of FIG. 8B includes sample winning bid histogram data relating to historical winning bids for historical impressions (e.g., processed by the ad server and/or other component(s) of the Advertising Service Provider System over the past 3 days) which are associated with an identified User-Site Entity. As illustrated in the example embodiment of FIG. 8B, a total of 60 impressions were processed for the identified User-Site Entity. Of the 60 total impressions:

10 of the impressions (852) received a highest bid value of $0.50;
20 of the impressions (854) received a highest bid value of $0.60; and
30 of the impressions (856) received a highest bid value of $1.00.

Table 860 of FIG. 8C includes sample data relating to computation of floor_e-CPM values for the identified User-Site Entity based on different percentile parameter values, and based on the winning bid histogram data of FIG. 8B. As illustrated in the example embodiment of FIG. 8C:

If it is determined that the percentile parameter value (for the identified User-Site Entity) is 5%, then a floor e-CPM value may be calculated in which not more than 5% of 60 total impressions have highest bids which are less than (or equal to) floor e-CPM value. In this particular scenario, it is noted that a plurality of different floor e-CPM values (e.g., ranging from $0.01-$0.49) may each satisfy the criteria that not more than 5% of 60 total impressions have highest bids which are less than (or equal to) floor e-CPM value. Accordingly, in at least one embodiment, it is preferable to choose the highest possible floor e-CPM value which satisfies the floor e-CPM calculation criteria. For example, if a floor e-CPM value of $0.48 is chosen, this value would satisfy the criteria that not more than 5% of 60 total impressions have highest bids which are less than (or equal to) floor e-CPM value since none of the 60 impressions have an associated highest bid which is less than or equal to $0.48. However, if a floor e-CPM value of $0.49 is chosen, this value would also satisfy the criteria that not more than 5% of 60 total impressions have highest bids which are less than (or equal to) floor e-CPM value since none of the 60 impressions have an associated highest bid which is less than or equal to $0.49. If a floor e-CPM value of $0.50 is chosen, this value would not satisfy the criteria that not more than 5% of 60 (5% of 60=3) total impressions have highest bids which are less than (or equal to) floor e-CPM value since 10 of the 60 impressions have an associated highest bid which is less than or equal to $0.50. Accordingly, in this particular scenario, $0.49 may be selected as the preferred, computed floor e-CPM value for the identified User-Site Entity.

If it is determined that the percentile parameter value (for the identified User-Site Entity) is 10%, then a floor e-CPM value may be calculated in which not more than 10% of 60 total impressions have highest bids which are less than (or equal to) floor e-CPM value. In this particular scenario, $0.49 may again be selected as the preferred, computed floor e-CPM value for the identified User-Site Entity, for reasons similar to those described above with respect to the 5% percentile parameter scenario.

If it is determined that the percentile parameter value (for the identified User-Site Entity) is 17%, then a floor e-CPM value may be calculated in which not more than 17% of 60 total impressions have highest bids which are less than (or equal to) floor e-CPM value. A preferred floor e-CPM value which satisfies these criteria is $0.59. This value would satisfy the criteria that not more than 17% of the 60 total impressions have highest bids which are less than (or equal to) floor e-CPM value since only 10 of the 60 impressions (e.g., 16.67% of total impressions) have an associated highest bid which is less than or equal to $0.59.

If it is determined that the percentile parameter value (for the identified User-Site Entity) is 20%, then a floor e-CPM value may be calculated in which not more than 20% of 60 total impressions have highest bids which are less than (or equal to) floor e-CPM value. A preferred floor e-CPM value which satisfies these criteria is $0.59. This value would satisfy the criteria that not more than 20% of the 60 total impressions have highest bids which are less than (or equal to) floor e-CPM value since only 12 of the 60 impressions (e.g., 16.67% of total impressions) have an associated highest bid which is less than or equal to $0.59.

If it is determined that the percentile parameter value (for the identified User-Site Entity) is 50%, then a floor e-CPM value may be calculated in which not more than 50% of 60 total impressions have highest bids which are less than (or equal to) floor e-CPM value. A preferred floor e-CPM value which satisfies these criteria is $0.60. This value would satisfy the criteria that not more than 50% of 60 total impressions have highest bids which are less than (or equal to) floor e-CPM value since 30 of the 60 impressions (e.g., 16.67% of total impressions) have an associated highest bid which is less than or equal to $0.60.

Figure 9:
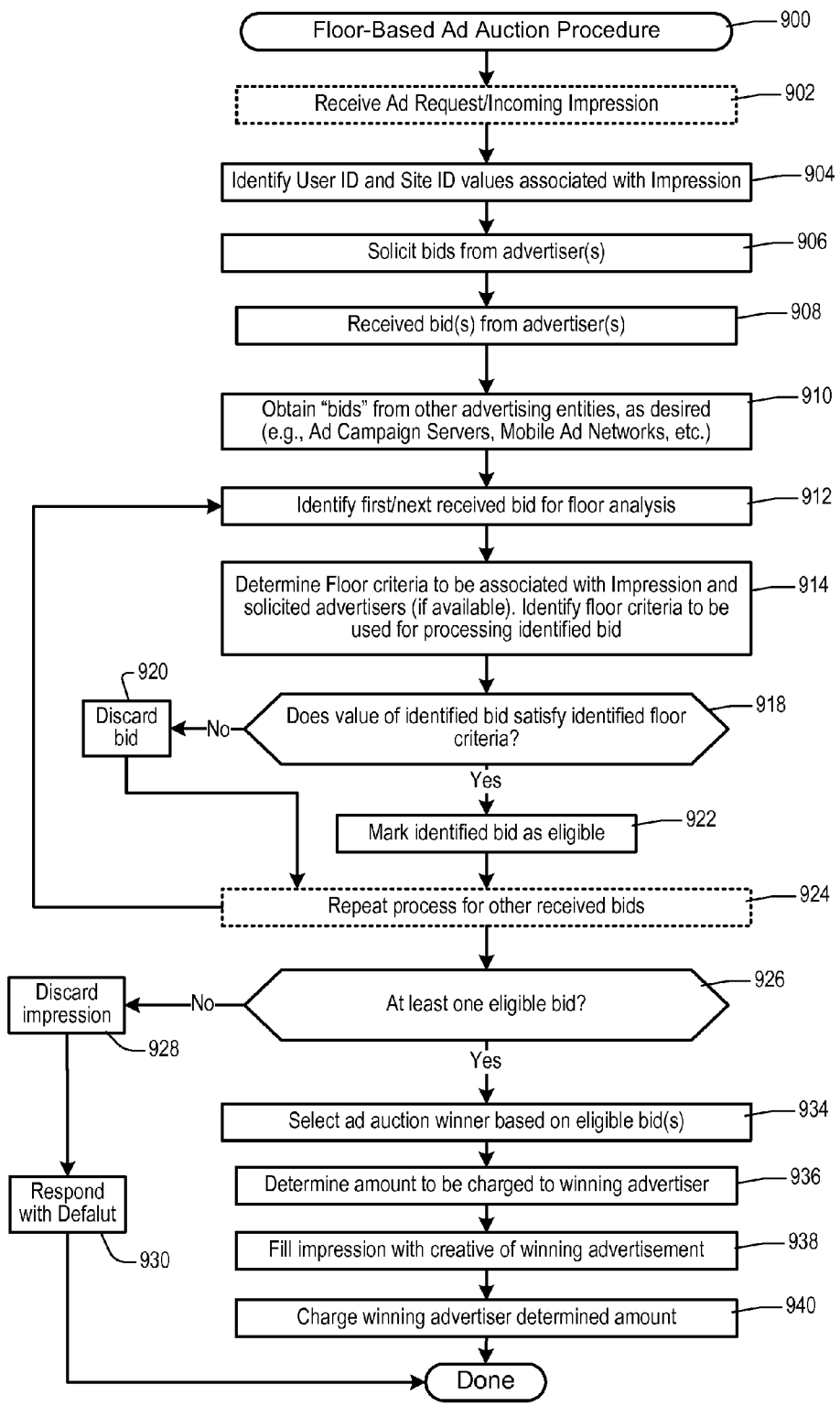

FIG. 9 shows an example flow diagram of a Floor-Based Ad Auction Procedure in accordance with a specific embodiment. In at least one embodiment, the Floor-Based Ad Auction Procedure may be configured or designed to facilitate use of Segment-based floors (and/or other specified floor criteria) in ad auctions. According to different embodiments, the Floor-Based Ad Auction Procedure may be implemented at an ad server or other component(s) of the Advertising Service Provider System. According to different embodiments, the Floor-Based Ad Auction Procedure may be implemented asynchronously from one or more of the other Ad Serving-related procedures described and/or referenced herein.

Referring to the specific example embodiment of FIG. 9, at 902, it is assumed that a first Ad Request for filling a first impression is received at an ad server of the Advertising Service Provider System. According to different embodiments, the received Ad Request may include various types of information about the first impression and associated web page such as, for example, one or more of the following (or combinations thereof): URL, demographic info relating to the end user (who will be viewing the ad), geolocation of end user, information relating to the end user's device (e.g., phone model), user data, publisher information, and/or other parameters such as one or more of those described and/or referenced herein.

In at least one embodiment, the first impression may be processed at the ad server (and/or other component(s) of the Advertising Service Provider System), and the first impression parameter values identified. In at least one embodiment, this may include identifying (904) a User ID parameter value (if present) and a Site ID parameter value associated with the first impression.

In at least one embodiment, the extracted first impression parameters may be supplemented with additional information retrieved from one or more local and/or remote database(s). Non-limiting examples of such additional information may include, but are not limited to, one or more of the following (or combinations thereof):

Audience Segment Information such as demographics of the end user who will be viewing the impression such as, for example, one or more of the following (or combinations thereof): Gender; Age; Ethnicity; Income classification; Interests; User ID; etc.;

Location information relating to where the impression will be displayed, such as, for example, one or more of the following (or combinations thereof): Country; State; Province; City; GPS coordinates; Zip code; Region; DMA (designated market area); etc.;

Technical parameters associated with the device that will be displaying the impression such as, for example, one or more of the following (or combinations thereof): Device make/model; Operating system type; Device display screen size; Display screen resolution; Browser type; Smartphone model/type; Screen resolution; etc.;

Time-related parameters, such as, for example, one or more of the following (or combinations thereof): Hour of Day; Date; Day of the week; Month; etc.;

Minimum Bid/Floor criteria (e.g., specified by the Publisher);

Other types of relevant and/or related information such as, for example, one or more of the following (or combinations thereof): Geolocation of the end user; Website Site ID; Webpage ID; Publisher ID; Ad size (e.g., size of ad to be displayed at end user device); Historical bid values; Historical click thru rates; Historical conversions; Cost per action; Context of the publisher page where ad will be displayed; etc.

As shown at 906, the ad server may solicit bids (or offers) for filling the first impression from a first set of advertiser(s)/Advertising Network(s) (collectively referred to herein as "Demand Partners"). According to different embodiments, the first set of advertiser(s)/Advertising Network(s) may include Real-Time Bid (RTB) Ad Networks which participate in real-time bidding (or real-time ad auctioning) of impressions such as, for example, specific advertisers and/or demand partners.

As shown at 908, it is assumed that the ad server receives one or more bids (e.g., responses which include bids) from the solicited RTB advertiser(s)/Ad Network(s).

As shown at 910, the ad server may determine or obtain "bids" or offers from other advertising entities such as, for example, one or more of the following (or combinations thereof):

Ad campaign servers (e.g., such as, for example, the ad server's AdFlex Ad Campaign System).

Mobile Ad Networks herein referred to as Mobile Display Networks ("Adnet") or Server-to-Server Networks ("S2S"), which, according to different embodiments, may include Beacon Based Ad Networks (BBCs) and/or Non-Beacon Based Ad Networks (NBBCs).

As shown at 912, a first (or next) received bid may be identified for floor analysis. According to different embodiments, the set of bids which may be identified and/or selected for floor analysis may include, but are not limited to, one or more of the following (or combinations thereof): RTB-related bids, Adnet/S2S-related bids, Ad Campaign-related bids, and/or other bids which may be considered for filling and monetizing the first impression).

As shown at 914, the ad server may determine the appropriate floor criteria (e.g., floor value(s)) to be associated with the first impression. For example, as described previously, a specific minimum e-CPM floor value may be determined for the first impression, based on the User ID and Site ID parameter values associated with the first impression. In at least one embodiment, the minimum e-CPM floor value for the first impression may have been predetermined via execution of the Floor Computation Workflow Procedure of FIG. 6.

In at least some embodiments, additional floor criteria may be determined for the first impression based on a variety of criteria and/or rules such as, for example, one or more of the following (or combinations thereof):

Identity of bidding advertiser/Advertising Network;
Rules set by Publisher;
Floor criteria specified in Ad Request/Impression;
Buyer ID;
DSP ID;
Top level domain of advertiser URL;
and/or other parameters and/or criteria described and/or referenced herein.

In at least one embodiment, for each solicited bid, the ad server may automatically and/or dynamically determine (e.g., in real-time) a respective floor value, which may differ with each bid, even though all bids are for the same Impression (e.g., which is associated with the same User-Site Entity). Accordingly, the ad server may identify (914) the specific floor criteria (e.g., minimum e-CPM floor value) to be used for processing the identified bid.

At 918, a determination may be made as to whether (or not) the value of the identified bid satisfies the identified floor criteria associated with the identified bid. For example, in the present example, the ad server may determine whether the e-CPM value of the identified bid is greater than or equal to the identified minimum e-CPM floor value associated with that particular bid. If it is determined that the e-CPM value of the identified bid is less than the specified minimum e-CPM floor value, the identified bid may be discarded (920). Alternatively, if it is determined that the e-CPM value of the identified bid is greater than or equal to the specified minimum e-CPM floor value, the identified bid may be marked (922) as an "eligible" bid. In at least some embodiments, if the ad server has not identified any minimum floor criteria in connection with the identified bid, then it may mark the identified bid as an "eligible" bid. In at least one embodiment, the ad server may be configured or designed to consider only "eligible" bids when conducting an ad auction for an identified impression.

If there are additional received bids which have not yet been processed for floor analysis, the ad server may repeat (924) the floor analysis operations (e.g., 912-922) for each of the additional received bids, screening each received bid to determine whether each bid satisfies its respective floor criteria (if available), discarding the bids which are identified as not satisfying their respective floor criteria, and marking as eligible those bids which are identified as satisfying their respective floor criteria.

After the floor analysis screening operations have been performed for each of the received bids relating to the first impression, the ad server may proceed with additional ad auction processing of the first impression if there is at least one eligible bid which has been identified (926). If no eligible bids are identified for the first impression, the impression may be discarded (928), and the ad server may respond to the received Ad Request with a default (930).

Assuming, however, that there is at least one eligible bid for the first impression, the ad server may proceed to select (934) the winner of the ad auction based on the pool of eligible bids. In at least one embodiment, the selected auction winner may correspond to the demand partner entity (e.g., advertiser, or Advertising Network) with the relatively highest eligible bid.

As shown at 936, the ad server may determine the amount to be charged to the ad auction winner. In second price auction environments, the ad server may identify:

the highest eligible bid and corresponding advertiser;
the second highest eligible bid;
floor value associated with highest eligible bid;

The amount to be charged to the ad auction winner may be determined to be the higher of: (i) the second highest eligible bid, or (ii) the floor value associated with the highest eligible bid. Another way of expressing this is that the amount to be charged to the ad auction winner may be determined according to:

Closing Auction Price=Max(floor value associated with winning bid, second highest eligible bid)

As shown at 938, the ad server may generate a response to the received ad request which includes creative provided by the winning advertiser for filling the first impression.

As shown at 940, the ad server may perform or initiate one or more activities for causing the winning advertiser to be charged the closing auction price (e.g., as determined at 936).

It will be appreciated that different embodiments of the Floor-Based Ad Auction Procedure (not shown) may include additional features and/or operations than those illustrated in the specific embodiment of FIG. 9, and/or may omit at least a portion of the features and/or operations of Floor-Based Ad Auction Procedure illustrated in the specific embodiment of FIG. 9.

Floor Computation Feedback/Adjustment Techniques

As described in greater detail herein, a variety of different metrics, heuristics, parameters, and other considerations may be used for measuring the effectiveness of the various User-based, Site-based, and Segment-based floors described herein, and for dynamically adjusting various Floor computation parameter values based on the measured floor metrics/heuristics.

Metrics/Heuristics Used for Measuring Effectiveness of Floor Usage for Sites

Typically, in a second price auction, the highest bidder is considered as the winner and will be charged the second highest bid price. If a floor is used in the auction, then it can affect the monetization and closing price (the price charged to winner). For example, if the floor value associated with an impression/bid is higher than the highest bid, then the impression will not be monetized by the bidders. In this case, the floor may be deemed to be "aggressive" for that impression. Since these types of impressions are not monetized, the potential revenue of these impressions may be lost. In one embodiment, the Aggressiveness parameter may be calculated according to:

$$\begin{aligned}\text{Aggressiveness} &= (\text{Impressions lost due to } \mathit{SBF})/\text{Total Impressions} \\ &= (\text{Impressions where floor was available} - \\ &\quad \text{Impressions that are monetized})/ \\ &\quad \text{Total Impressions}\end{aligned}$$

If the floor value is less than the highest bid price but higher than that of the second highest bid, then the winner may be charged the floor value. In this case, the floor may be deemed to "hit" on the impression. Because the auction winner is being charged the floor value (e.g., which is higher than second highest bid in this case), the Advertising Service Provider System is effectively increasing the closing auction price (and hence revenue) of these impressions.

Alternatively, if the floor value is less than the second highest bid price, then the floor may have no effect or impact on the auction, and the winner may be charged the second highest bid price as usual. In such cases, the floor may be deemed to be "conservative" for that impression.

In at least one embodiment, in order to measure the performance and effectiveness of segment-based floors, the Advertising Service Provider System may measure the distributions of "aggressive", "hit" and "conservative" cases over a specified time interval. By way of illustration, assume that during the past 7 days there were 100 impressions available from a Publisher in connection with a specific site (e.g., Site A). Further assume that 70 of the impressions were generated for users in which the Advertising Service Provider System had computed respective User-Site floor values for each User-Site Entity. Also assume that 40 of these 70 impressions were monetized (e.g., ad auction successfully completed, and impression successfully filled), and that 30 of these 40 impressions used the User-Site floor value as the auction closing price. In this example illustration, the Advertising Service Provider System may determine that the segment-based floors "cover" 70% (70/100) of the impressions, and that the segment-based floors have: a "hit" rate of ((30/100)* 100)% (i.e., 30%), a "conservative" rate of ((40-30)/ 100*100)% (i.e., 10%), and an "aggressiveness" rate of ((70-40)/100*100)% (i.e., 30%).

Along with counting impressions corresponding to these cases, the Advertising Service Provider System may also calculate the effect of the floors on the revenue of these impressions. One heuristic which may be used to measure the effect of floors on the impression revenue is referred to herein as the "estimated revenue lift" heuristic, which, for example, may be expressed according to:

$$\begin{aligned}\text{Estimated Revenue Lift} = &(\text{estimated revenue due to segment-} \\ &\text{based floor hit impressions}) \\ &-(\text{estimated revenue loss due to} \\ &\text{segment-based floor aggressive} \\ &\text{impressions}) \\ &-(\text{estimated revenue of segment-based} \\ &\text{floor hit assuming segment-based} \\ &\text{floor was not present})\end{aligned}$$

According to different embodiments, the Advertising Service Provider System may compute one or more of the above-described heuristics (e.g., for a given Site) in percentages and/or absolute numbers.

Metrics/Heuristics Used for Measuring Effectiveness of Floor Usage for Site-Segment Similar to the Site-level heuristic measurements described above, the Advertising Service Provider System may count and/or compute values for the aggressiveness, conservativeness and revenue lift heuristics of impressions corresponding to each Site-Segment.

Metrics/Heuristics Used for Dynamically Determining Updated Percentile Value(s) for Site-Segments It is noted that higher floor values used in ad auctions typically result in increased amounts of revenue obtained from floor "hit" impressions. However, it is also recognized that the higher the floor values, the greater the chances of achieving "aggressive" impressions. In some embodiments, Publishers may prefer that the total aggressive impressions at Site level is below a threshold value (e.g., site_aggressiveness_threshold 10% of total impressions for the Site). Accordingly, in at least some embodiments, the Advertising Service Provider System may be configured or designed to implement one or more floor adjustment feedback mechanisms to automatically, dynamically, asynchronously and/or periodically adjust the floor computation percentiles so as to balance revenue lift due to floors and aggressiveness due to floors, for example.

Factors/Parameters for Setting Floors

Impressions are brought by the demand sources and are valued based on multiple factors (directly or indirectly) such as, for example, one or more of the following (or combinations thereof):

User ID associated with a given impression
Site from where the impression is coming
Time of Day
and/or other parameters which may be associated with a given impression.

In many embodiments described herein, the Advertising Service Provider System may include functionality for analyzing the effect of using User-Site level floors. However, it will be appreciated that in other embodiments, ad servers may be configured or designed to include functionality for analyzing the effects of using floors based on additional factors and/or parameters, thereby making the floors more granular and hence more effective and accurate.

User Behaviors

In at least some embodiments, the Advertising Service Provider System may observer or detect strong signals from bids associated with specific users, which, for example, may be due (at least in part) to audience targeting techniques. In one embodiment, an ad server may identify and/or designate such users as "high valued" users, and may be configured or designed to automatically identify impressions associated with "high valued" and to automatically initiate one or more actions/operations to help ensure that these impressions are monetized fairly.

In at least one embodiment, the Advertising Service Provider System may track the pattern of bids for specific users such as "high valued" users. As a cleaning step, the Advertising Service Provider System may filter the users based on parameters such as:
- Volume of impressions filled for identified User (e.g., User ID);
- Consistency of appearance for identified User;
- Number of days that the identified User has appeared on Site;
- Number of filled impressions the User has viewed (or has been displayed at User's system;
- And/or other filtering parameters.

Dynamically Configurable Process Parameters

According to different embodiments, there are a number of different, dynamically configurable process parameters which may be used for implementing the various floor computation techniques and floor feedback/adjustment techniques described herein. The specific values assigned to each of these parameters may affect one or more aspects of the floor computation techniques and floor feedback/adjustment techniques. Examples of at least some of these dynamically configurable process parameters may include, but are not limited to, one or more of the following (or combinations thereof):

- LookupWindowDuration $w_{site}$—This parameter may represent the number of past days' historical ad serving data that is used for computing the floor. For example, in one embodiment, the Advertising Service Provider System may be configured or designed to look back at 3 (or 4) days of data for specified Sites to assemble a list of users and their associated bids for use in computing specific User-Site floor values. In some embodiments, this parameter value may be changed at the Site level. In one embodiment, a default value is 3 (e.g., 3 days). Increasing the Lookup Window Duration parameter may result in noisy or less informative data for learning floors. Decreasing the Lookup Window Duration parameter may result fewer number of entities in which floors are applied. A preferred value for this parameter may depend on Entity retention rate preferences.

- UserFilteringThreshold $ti_{site}$—In at least one embodiment, the User Filtering Threshold may be used to assist the Advertising Service Provider System in identifying and determining which types of users should (and should not) be considered for floor computation purposes. According to different embodiments, the Advertising Service Provider System may specify the User Filtering criteria in terms of (a) number of days a user has appeared and/or (b) number of impressions the user has received. For example, if, for a given time period, the number of Site impressions for an identified user is below the User Filtering Threshold value, that user may be skipped from floor computation processing. This parameter may also be used for filtering out noisy Entities. In one embodiment, its default value is 0. In some embodiments, this parameter value may be adjusted at the Site level.

- Floor Computation Percentile Parameter $p_{site,segment}$—This parameter may be used for computing floor(s) for a given Entity from the Entity's bid histogram. For example, the floor value for an identified Entity may be calculated as $p_{site,segment}$ percentile of the Entity's associated bid histogram. For example, in one embodiment, a Floor Computation Percentile Parameter may correspond to the percentile p used in floor computation for a given Entity. For example, what percentile p of the first price bids should be considered as the floor for a given user, group of users, or other specified entity (e.g., User-Site Entity). In some embodiments, the Advertising Service Provider System may group similar users together (herein referred to as "tiers" or "virtual segments") based on their associated e-CPM values. Different tiers of users (or different Entity tiers) may have different respective Floor Computation percentile parameter values. In one embodiment, its default value is 5 (e.g., 5%). According to different embodiments, the Floor Computation Percentile Parameter may be automatically and/or dynamically updated using one or more Floor Computation Feedback/Adjustment Techniques described herein. In some embodiments, this parameter value may be adjusted at the Site-Segment level.

- AggressivenessThreshold $aggr_{site}$—This parameter may represent the maximum allowed fraction (or percentage) of aggressive impressions of a given Site as compared to the total impressions of the Site. In one embodiment, its default value is 0.2. The $aggr_{site}$ parameter value may be used by the Advertising Service Provider System as a comparison value during feedback process(es) for determining whether site level aggressiveness of the floors are: too high, near acceptable levels, and/or within acceptable levels. In some embodiments, this parameter value may be adjusted at the Site level.

Continuous Floor Feedback Mechanisms

According to different embodiments, the floor values may be computed and/or updated at periodic intervals (e.g., once a day, every n hours, every n days). For example, in one embodiment, updated floor values for selected User-Site Entities may be computed each day. In order to avoid or reduce the chances of computed floor values going aggressive or conservative (e.g., with respect to bids for a given Site), the measurements of past (or historical) floor effectiveness may be taken into account when updating the floor computation related parameters. For example, in some embodiments, the Advertising Service Provider System may automatically and dynamically adjust the Floor Computation percentile parameter values associated with a given Site-Segment such that:
- Percent of total impressions defaulted (e.g., due to aggressive floor values) for the Site-Segment (e.g., as measured during a specified time interval) are below a specified site_aggressiveness_threshold (e.g., site_aggressiveness_threshold=10%).
- The number of impressions of the Site where the floor is conservative is reduced (e.g., reduced below some target site_conservative_threshold such as 10%). For example, in one embodiment, it may be desirable to maximize revenue opportunity if: (i) the aggressiveness is below site_aggressiveness_threshold, and (ii) the estimated revenue is lift is positive, or the conservativeness value meets or exceeds a site_conservative_threshold value (e.g., site_conservative_threshold=10%) (e.g., the conservative impressions of this segments accounts to more than 10% of site level conservative impressions).

For example, in at least one embodiment, the different possibilities for the percentile adjustment may include, but are not limited to, one or more of the following (or combinations thereof):
- Increase the percentile p value by some step (e.g., increase by 10 or 5 depending on the magnitude of aggressiveness and estimated revenue lift).

Decrease the percentile p value by some step (e.g., decrease by 10 or 20 depending on the magnitude of aggressiveness at site or site segment level).

Keep the same percentile as the previous day percentile.

Etc.

In one embodiment, the updates or adjustments to the Floor Computation percentile parameters may be made for each tier (e.g., group of users) or for selected tiers in the Site. According to different embodiments, the updates/adjustments to the Floor Computation percentile parameters may be automatically and dynamically performed at periodic intervals (e.g., once a day, every other day, every 2 days, every n hours, every n days, etc.).

Figure 10:
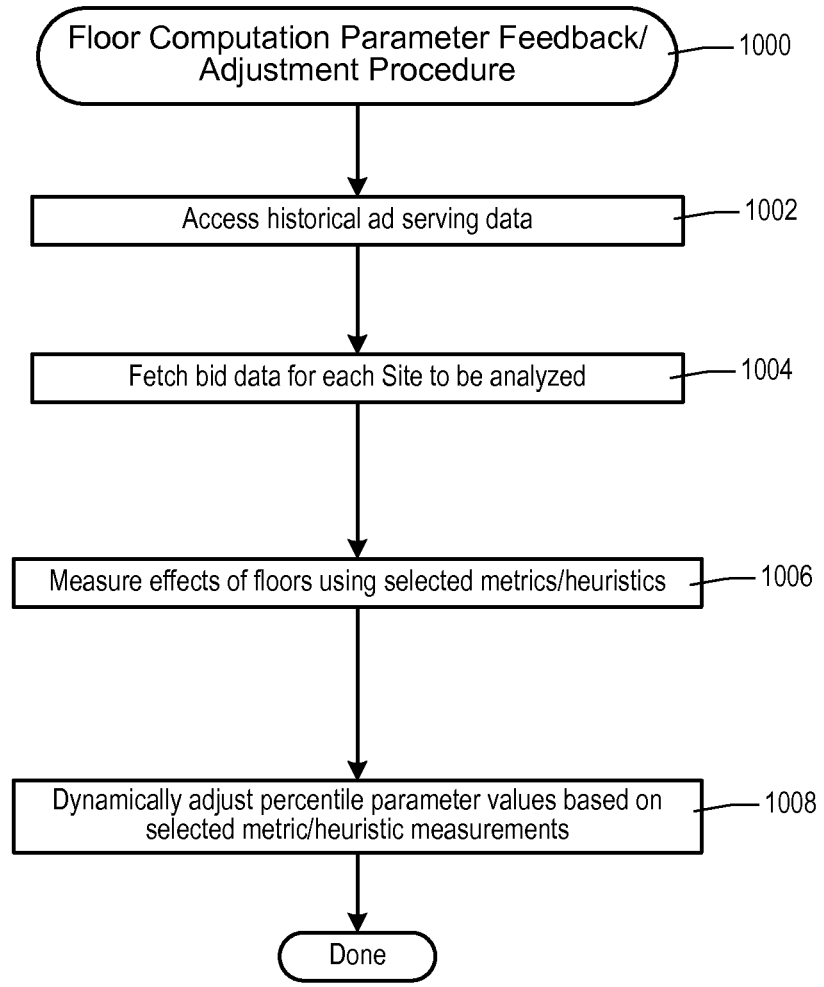

FIG. 10 shows an example flow diagram of a Floor Computation Parameter Feedback/Adjustment Procedure in accordance with a specific embodiment. In at least one embodiment, the Floor Computation Parameter Feedback/Adjustment Procedure may be configured or designed to measure the effect of previously applied segment-based floors, and to automatically and dynamically adjust desired floor computation parameters accordingly. According to different embodiments, the Floor Computation Parameter Feedback/Adjustment Procedure may be implemented at an ad server or other component(s) of the Advertising Service Provider System. According to different embodiments, the Floor Computation Parameter Feedback/Adjustment Procedure may be implemented asynchronously from one or more of the other Ad Serving-related procedures described and/or referenced herein. In at least one embodiment, the Floor Computation Parameter Feedback/Adjustment Procedure may be configured or designed to update various floor computation parameters at periodic intervals (e.g., every 2 days).

As shown at 1002, historical ad serving data may be accessed by the Advertising Service Provider System. In at least one embodiment, the historical ad serving data may include logs of all RTB bids on the Advertising Service Provider System's platform, and may also include various impression parameters and price points associated with each bid.

As shown at 1004, bid data for each Site (or for selected Sites to be analyzed) may be retrieved from the historical ad serving data. For example, in some embodiments, the adjustment/updating of the floor computation parameters may be based on the previous n days (e.g., n=7) of historical ad serving data.

As shown at 1006, the Advertising Service Provider System may measure the effects of floors using selected metrics and/or heuristics such as, for example, one or more of those described herein. For example, using one week of historical ad serving data, various metrics of the segment-based floor may be computed for each (or selected) Site-Segment (e.g., aggregated across all impressions for a given Site-Segment), such as, for example, one or more of the following (or combinations thereof):

RTB win rate;

coverage (e.g., fraction or percentage of impressions having for which server-based floors were computed);

aggressiveness (e.g., fraction or percentage of impressions not monetized in RTB due to server-based floors);

hit rate (e.g., fraction or percentage of impressions where the server-based floor was applied as second price);

conservativeness (e.g., fraction or percentage of impressions where server-based floors were below second price);

estimated revenue lift;

etc.

In computing values for one or more of these metrics, equal weightage may be given to each impression. However, in at least some embodiments, non-equal weightage may be given to different impressions, such as, for example, assigning relatively higher weights for more recent days' data.

As shown at 1010, the Advertising Service Provider System may automatically and dynamically adjust percentile parameter values for each (or selected) Site-Segment based on one or more of the metric/heuristic measurements (e.g., performed at 1006). One example of a high-level computer implemented procedure which may be used for dynamically determining updated percentile value(s) for an identified Site-Segment may be described as follows:

IF Revenue lift measured due to floors in the Site-Segment<0, THEN Decrease percentile of this Site-Segment by 10.

IF (Aggressiveness measured at site level>site_aggressiveness_threshold),

AND (Aggressiveness measured at this Site-Segment>10% of aggressiveness measured at site), THEN Decrease percentile of this Site-Segment by 10.

IF Revenue lift measured due to floors in this Site-Segment>0,

AND Net aggressiveness measured at site level<site_aggressiveness_threshold),

THEN Increase percentile of this Site-Segment by 10.

According to different embodiments, the various segment-based floor techniques described herein may be selectively enabled on all (or selected) sites which are serviced by the Advertising Service Provider System's platform, unless manually added to skip list. For new sites added to the Advertising Service Provider System's platform, segment-based floor may be enabled with default values for parameters, if sufficient numbers of impressions are observed consistently over a 10 day period.

Additional details relating to various aspects of online advertising technology are disclosed in the following references:

U.S. patent application Ser. No. 12/510,061, by Goel et al., titled "DYNAMIC SELECTION OF OPTIMAL ADVERTISING NETWORK", filed Jul. 27, 2009, the entirety of which is incorporated herein by reference for all purposes.

U.S. patent application Ser. No. 13/708,435, by KUMAR et al., titled "GRANULAR CONTROL APPLICATION FOR DELIVERING ONLINE ADVERTISING", filed Dec. 7, 2012, the entirety of which is incorporated herein by reference for all purposes.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for calculating ad auction floor values for use in ad auctions conducted over an electronic data network, the method comprising causing at least one processor to execute a plurality of instructions for:

identifying a first set of parameters for use in determining a first floor value representing a first minimum auction closing price for use with impression-related ad auctions;

identifying, as part of the first set of parameters, a User ID parameter specifying a first User ID parameter value representing an identity of a first end user;

identifying, as part of the first set of parameters, a Site ID parameter specifying a first Site ID parameter value;

accessing historical ad-serving records to retrieve a first set of winning bid histogram information relating to historical ad auctions conducted for a first set of ad impressions, wherein each of the first set of ad impressions is associated with the first User ID parameter value;

using the first set of winning bid histogram information to dynamically determine a first floor value representing a first minimum auction closing price for use in ad auctions conducted for at least one ad impression associated with the first User ID parameter value, wherein the first set of winning bid histogram information relates to historical ad auctions conducted for the first set of ad impressions, the first set of ad impressions being associated with both the first User ID parameter value and the first Site ID parameter value;

identifying a second set of parameters for use in determining a second floor value representing a second minimum auction closing price for use with impression-related ad auctions;

identifying, as part of the second set of parameters, a User ID parameter specifying a second User ID parameter value representing an identity of a second end user which is different from the first end user;

identifying, as part of the second set of parameters, a Site ID parameter specifying the first Site ID parameter value;

accessing historical ad-serving records to retrieve a second set of winning bid histogram information relating to historical ad auctions conducted for a second set of ad impressions, wherein each of the second set of ad impressions is associated with the second User ID parameter value; and using the second set of winning bid histogram information to dynamically determine a second floor value representing a second minimum auction closing price for use in ad auctions conducted for at least one ad impression associated with the second User ID parameter value, wherein the second set of winning bid histogram information relates to historical ad auctions conducted for the second set of ad impressions, the second set of ad impressions being associated with both the second User ID parameter value and the first Site ID parameter value;

wherein the first floor value represents a first User-Site Entity floor value;

wherein the second floor value represents a second User-Site Entity floor value;

wherein the first User-Site Entity is different from the second User-Site Entity; and wherein the first floor value is different from the second floor value.

2. The computer implemented method of claim 1 further comprising causing the at least one processor to execute additional instructions for:

wherein the first floor value represents the first minimum auction closing price for use in ad auctions conducted for at least one ad impression associated with both the first User ID parameter value and the first Site ID parameter value;

wherein the second set of winning bid histogram information relates to historical ad auctions conducted for the second set of ad impressions, the second set of ad impressions being associated with both the second User ID parameter value and the first Site ID parameter value; and wherein the second floor value represents the second minimum auction closing price for use in ad auctions conducted for at least one ad impression associated with both the second User ID parameter value and the first Site ID parameter value.

3. The computer implemented method of claim 1 further comprising causing the at least one processor to execute additional instructions for:

identifying, as part of the first set of parameters, a Site ID parameter specifying a first Site ID parameter value;

wherein the first set of winning bid histogram information relates to historical ad auctions conducted for the first set of ad impressions, the first set of ad impressions being associated with both the first User ID parameter value and the first Site ID parameter value;

wherein the first floor value represents the first minimum auction closing price for use in ad auctions conducted for at least one ad impression associated with both the first User ID parameter value and the first Site ID parameter value;

identifying, as part of the second set of parameters, a Site ID parameter specifying the first Site ID parameter value;

wherein the second set of winning bid histogram information relates to historical ad auctions conducted for the second set of ad impressions, the second set of ad impressions being associated with both the second User ID parameter value and the first Site ID parameter value;

wherein the second floor value represents the second minimum auction closing price for use in ad auctions conducted for at least one ad impression associated with both the second User ID parameter value and the first Site ID parameter value;

wherein the first User ID parameter value represents an identity of a first end user;

wherein the second User ID parameter value represents an identity of a second end user which is different from the first end user; and wherein the first Site ID parameter value represents an identity of a first website.

4. The computer implemented method of claim 1 further comprising causing the at least one processor to execute additional instructions for:

measuring effects of use of the first floor value in a first set of ad auctions conducted for a third set of ad impressions; and automatically and dynamically adjusting the first floor value based on the measured effects of the use of the first floor value in the first set of ad auctions.

5. The computer implemented method of claim 1 further comprising causing the at least one processor to execute additional instructions for:

measuring effects of use of the first floor value in a first set of ad auctions conducted for a third set of ad impressions, wherein each of the third set of ad impressions is associated with the first User ID parameter value;

automatically and dynamically adjusting the first floor value based on the measured effects of the use of the first floor value in the first set of ad auctions;

measuring effects of use of the second floor value in a second set of ad auctions conducted for a fourth set of ad impressions, wherein each of the fourth set of ad impressions is associated with the second User ID parameter value; and automatically and dynamically adjusting the second floor value based on the measured effects of the use of the second floor value in the second set of ad auctions.

6. A computer implemented method for facilitating servicing of ad requests over an electronic data network, the method comprising causing at least one processor to execute a plurality of instructions for:

receiving, at an ad server, a first ad request, the first ad request including information relating to a first ad impression to be displayed in connection with a display of a first web page at a first end user's device, the first web page being associated with a first website, the first website being associated with a first publisher, the first ad impression having associated therewith a first set of impression parameters including a first User ID parameter specifying a first User ID parameter value;

identifying, at the ad server, the first User ID parameter value associated with the first ad impression;

dynamically determining, using the first User ID parameter value, a first floor value representing a first minimum auction closing price for use in a first ad auction relating to the first ad impression;

conducting, at the ad server, the first ad auction using the first floor value;

receiving, at the ad server, a first bid in connection with the first ad auction, the first bid having associated therewith a first bid value;

comparing, at the ad server, the first bid value and the first floor value;

rejecting the first bid if it is determined that the first bid value is less than the first floor value;

receiving, at the ad server, a second ad request, the second ad request including information relating to a second ad impression to be displayed in connection with a display of the first web page at a second end user's device, the second ad impression having associated therewith a second set of impression parameters including a second User ID parameter specifying a second User ID parameter value;

identifying, at the ad server, the second User ID parameter value associated with the second ad impression;

dynamically determining, using the second User ID parameter value, a second floor value representing a second minimum auction closing price for use in a second ad auction relating to the second ad impression;

conducting, at the ad server, the second ad auction using the second floor value;

receiving, at the ad server, a second bid in connection with the second ad auction, the second bid having associated therewith a second bid value;

comparing, at the ad server, the second bid value and the second floor value; and rejecting the second bid if it is determined that the second bid value is less than the second floor value;

wherein the first User ID parameter value represents an identity of the first end user;

wherein the second User ID parameter value represents an identity of the second end user which is different from the first end user wherein the first floor value represents a first User-Site Entity floor value;

wherein the second floor value represents a second User-Site Entity floor value;

wherein the first User-Site Entity is different from the second User-Site Entity; and wherein the first floor value is different from the second floor value.

7. The computer implemented method of claim 6 wherein the first set of impression parameters includes a first Site ID parameter identifying the first website, and wherein the second set of impression parameters includes a second Site ID parameter identifying the first website, the method further comprising causing the at least one processor to execute additional instructions for:

identifying, at the ad server, the first Site ID parameter;

wherein the dynamic determining of the first floor value includes dynamically determining the first floor value using both the first User ID parameter value and the first Site ID parameter;

identifying, at the ad server, the second Site ID parameter; and wherein the dynamic determining of the second floor value includes dynamically determining the second floor value using both the second User ID parameter value and the second Site ID parameter.

8. The computer implemented method of claim 6 wherein the first set of impression parameters includes a first Site ID parameter identifying the first website, and wherein the second set of impression parameters includes a second Site ID parameter identifying the first website, the method further comprising causing the at least one processor to execute additional instructions for:

identifying, at the ad server, the first Site ID parameter;

wherein the dynamic determining of the first floor value includes dynamically determining the first floor value using both the first User ID parameter value and the first Site ID parameter;

identifying, at the ad server, the second Site ID parameter;

wherein the dynamic determining of the second floor value includes dynamically determining the second floor value using both the second User ID parameter value and the second Site ID parameter.

9. A system for adjusting ad auction floor values for use in ad auctions conducted over an electronic data network, comprising:

an ad server in communication with multiple advertising networks, the ad server including:
  a processor and a memory;
  a machine learning component and a data mining component to analyze historical auction data;
  an auction module and a floor determination module;

the ad server configured to:

generate at least two floor values based on analyzing historical ad serving records for a plurality User-Site entities, including for each User-Site entity of a plurality of User-Site entities:
  for each User-Site entity, identify an end user and a website ID and accessing historical ad-serving records to retrieve winning bid histogram information relating to historical ad auctions conducted for a set of ad impressions associated with the User-Site entity;
  for each User-Site entity, use the winning bid histogram information to dynamically determine a floor value for the User-Site entity representing a minimum auction closing price for use in ad auctions conducted for at least one ad impression, thus forming associations between individual User-Site entities and corresponding floor values; and perform an auction, comprising:
  solicit bids for an ad impression from multiple ad networks;
  determine the User-Site entity of the ad impression;
  determine a floor value based on a User-Site entity associated with the ad impression;
  determine eligible bids for the ad impression based on the determined floor value; and
  select an ad auction winner based on eligible bids;

wherein each user is an individual human user and each site is a website.

10. A system for adjusting ad auction floor values for use in ad auctions conducted over an electronic data network, comprising:
- an ad server in communication with multiple advertising networks, the ad server including:
  - a processor and a memory;
  - a machine learning component and a data mining component to analyze historical auction data;
- an e-CPM floor determination module configured to:
- receive an ad fulfillment request for an ad impression;
- identify a first set of parameters for use in determining a first floor value representing a first minimum auction closing price for use with impression-related ad auctions, the first set of parameters representing a first User-Site entity identifying a first end user and a first website ID;
- access historical ad-serving records to retrieve a first set of winning bid histogram information relating to historical ad auctions conducted for a first set of ad impressions, wherein each of the first set of ad impressions is associated with the first set of parameters;
- use the first set of winning bid histogram information to dynamically determine a first floor value representing a first minimum auction closing price for use in ad auctions conducted for at least one ad impression associated with the first set of parameters;
- identify a second set of parameters for use in determining a second floor value representing a second minimum auction closing price for use with impression-related ad auctions, the second set of parameters representing a second User-Site Entity identifying a second end user that is different from the first end user;
- identify, as part of the second set of parameters, a User ID parameter specifying a second User ID parameter value representing an identity of a second end user which is different from the first end user and the first website ID;
- access historical ad-serving records to retrieve a second set of winning bid histogram information relating to historical ad auctions conducted for a second set of ad impressions, wherein each of the second set of ad impressions is associated with the second set of parameters;
- use the second set of winning bid histogram information to dynamically determine a second floor value representing a second minimum auction closing price for use in ad auctions conducted for at least one ad impression associated with the second set of parameters, wherein the second set of winning bid histogram information relates to historical ad auctions conducted for the second set of ad impressions, the second set of ad impressions being associated with both the second User and the first website ID;
- solicit bids for the ad impression from the multiple advertising networks;
and
- determine eligible bids based on the first and second floor values and select an ad auction winner.

\* \* \* \* \*